US010571937B1

(12) United States Patent
Hurst

(10) Patent No.: US 10,571,937 B1
(45) Date of Patent: Feb. 25, 2020

(54) VALVE CONTROL APPARATUS

(71) Applicant: Colt Irrigation LLC, Goleta, CA (US)

(72) Inventor: James Walter Hurst, Goleta, CA (US)

(73) Assignee: Colt Irrigation, LLC, Goleta, CA (US)

( * ) Notice: Subject to any disclaimer, the term of this patent is extended or adjusted under 35 U.S.C. 154(b) by 37 days.

(21) Appl. No.: 15/889,549

(22) Filed: Feb. 6, 2018

Related U.S. Application Data

(63) Continuation-in-part of application No. 15/075,663, filed on Mar. 21, 2016, now Pat. No. 10,088,849, which is a continuation-in-part of application No. 14/599,356, filed on Jan. 16, 2015, now Pat. No. 9,599,286.

(60) Provisional application No. 62/455,830, filed on Feb. 7, 2017, provisional application No. 62/139,526, filed on Mar. 27, 2015, provisional application No. 62/087,186, filed on Dec. 3, 2014, provisional application No. 61/930,866, filed on Jan. 23, 2014.

(51) Int. Cl.
*G05D 7/06* (2006.01)
*F16K 31/04* (2006.01)
*F16K 11/07* (2006.01)

(52) U.S. Cl.
CPC ........ *G05D 7/0635* (2013.01); *F16K 11/0716* (2013.01); *F16K 31/047* (2013.01)

(58) Field of Classification Search
CPC ..... Y10T 137/86614; Y10T 137/87209; Y10T 137/86622; Y10T 137/86606; Y10T 137/8671; F16K 11/0712; F16K 31/124; F16K 31/128; F16K 31/42; F16K 31/423; F16K 31/52; F16K 31/0613; F16K 31/047; F16K 11/0716; G05D 7/005; G05D 7/0635
See application file for complete search history.

(56) References Cited

U.S. PATENT DOCUMENTS

| | | | |
|---|---|---|---|
| 981,271 A | 1/1911 | Hutchins | |
| 1,590,558 A | 6/1926 | Stenhouse | |
| 1,606,245 A | 11/1926 | Lang | |
| 1,704,374 A | 3/1929 | Stewart et al. | |
| 1,812,586 A | 6/1931 | Elder | |
| 1,826,450 A | 10/1931 | Bragg et al. | |
| 1,859,357 A | 5/1932 | Elder | |

(Continued)

FOREIGN PATENT DOCUMENTS

| | | |
|---|---|---|
| EP | 2 687 763 A1 | 1/2014 |
| GB | 1 491 779 | 11/1977 |

(Continued)

OTHER PUBLICATIONS

4000 Series Indexing Valves from http://web.archive.org/web/20060312222240/http://www.krain.com/index.cfm?fuseaction=indexingvlvs.4000series&CFID=28203112&CFTOKEN=85029057, Mar. 12, 2006.

(Continued)

*Primary Examiner* — Matthew W Jellett

(74) *Attorney, Agent, or Firm* — Knobbe, Martens, Olson & Bear LLP

(57) ABSTRACT

Embodiments of a fluid flow regulating device and methods of using the same are described. Certain embodiments manages fluid flow between one or more input ports and output ports at least partly in response to a control signal received at an electric circuit which cause motor driven state transitions prior to an electro-mechanical circuit break.

21 Claims, 27 Drawing Sheets

(56) References Cited

U.S. PATENT DOCUMENTS

| | | |
|---|---|---|
| 1,901,496 A | 3/1933 | Elder |
| 2,059,126 A | 10/1936 | Malthaner |
| 2,311,108 A | 2/1943 | Hauser |
| 2,341,041 A | 2/1944 | Hauser |
| 2,389,817 A | 11/1945 | Rider |
| 2,404,514 A | 7/1946 | McClure |
| 2,418,794 A | 4/1947 | Severson |
| 2,533,960 A | 12/1950 | Rothschild |
| 2,591,216 A | 4/1952 | Thompson et al. |
| 2,619,105 A | 11/1952 | Hauswer |
| 2,625,429 A | 1/1953 | Coles |
| 2,641,280 A | 6/1953 | Fleischhauer |
| 2,642,076 A | 6/1953 | Tigert et al. |
| 2,678,662 A | 5/1954 | Boteler |
| 2,744,541 A | 5/1956 | Fleischhauer |
| 2,749,080 A | 6/1956 | Griswold |
| 2,771,905 A | 11/1956 | Griswold |
| 2,784,648 A | 3/1957 | Zelewsky |
| 2,837,241 A | 6/1958 | Griswold |
| 2,844,167 A | 7/1958 | Griswold |
| 2,861,301 A | 11/1958 | Haberlin |
| 2,880,757 A | 4/1959 | Campbell |
| 2,919,590 A | 1/1960 | Griswold |
| 2,921,629 A | 1/1960 | Stout |
| 2,931,233 A | 4/1960 | Griswold |
| 2,944,565 A | 7/1960 | Dahl |
| 2,986,167 A | 5/1961 | Griswold |
| 2,991,796 A | 7/1961 | Griswold |
| 3,003,514 A | 10/1961 | Furlong |
| 3,018,788 A | 1/1962 | Perlis |
| 3,042,074 A | 7/1962 | Graybill |
| 3,103,339 A | 9/1963 | Rose |
| 3,105,518 A | 10/1963 | Kunz |
| 3,108,609 A | 10/1963 | Schroder |
| 3,125,112 A | 3/1964 | Maurice |
| 3,147,770 A | 9/1964 | Perlis |
| 3,181,551 A | 5/1965 | Coletti |
| 3,204,872 A | 9/1965 | Whear |
| 3,217,653 A | 11/1965 | Griswold |
| 3,224,458 A | 12/1965 | Davis |
| 3,226,909 A | 1/1966 | Zelewsky et al. |
| 3,232,317 A | 2/1966 | Fowler |
| 3,241,569 A | 3/1966 | Sully et al. |
| 3,252,285 A | 5/1966 | Krautwurst et al. |
| 3,256,909 A | 6/1966 | Obidniak et al. |
| 3,278,424 A | 10/1966 | Griswold |
| 3,303,755 A | 2/1967 | Linker et al. |
| 3,335,756 A | 8/1967 | McPherson |
| 3,336,843 A | 8/1967 | Griswold |
| 3,344,809 A | 10/1967 | Smith |
| 3,367,621 A | 2/1968 | Griswold |
| 3,369,565 A | 2/1968 | Haggard, Jr. |
| 3,402,890 A | 9/1968 | Heitzman |
| 3,405,733 A | 10/1968 | Hansen |
| 3,420,270 A | 1/1969 | Neyer |
| 3,422,847 A | 1/1969 | Polizzi |
| 3,431,933 A | 3/1969 | Tidd |
| 3,454,048 A | 7/1969 | Van der Veer |
| 3,478,780 A | 11/1969 | Gheen |
| 3,480,034 A | 11/1969 | Jerome |
| 3,512,543 A | 5/1970 | Kubik |
| 3,519,016 A | 7/1970 | Kah et al. |
| 3,524,470 A | 8/1970 | Kah et al. |
| 3,540,213 A | 11/1970 | Johnston et al. |
| 3,604,456 A | 9/1971 | Jones |
| 3,635,237 A | 1/1972 | Kah et al. |
| 3,730,208 A | 5/1973 | Lewis |
| 3,735,722 A | 5/1973 | Hunter et al. |
| 3,747,620 A | 7/1973 | Kah, Jr. |
| 3,752,184 A | 8/1973 | Griswold |
| 3,779,269 A | 12/1973 | Gould |
| 3,785,391 A | 1/1974 | Miller |
| 3,791,619 A | 2/1974 | Pett |
| 3,797,740 A | 3/1974 | Kah et al. |
| 3,838,046 A | 9/1974 | Hunter |
| 3,845,777 A | 11/1974 | Gilson |
| 3,853,145 A | 12/1974 | Judd |
| 3,867,961 A | 2/1975 | Rudelick |
| 3,870,274 A | 3/1975 | Broe |
| 3,888,143 A | 6/1975 | Kolehmainen et al. |
| 3,938,426 A | 2/1976 | Hunter et al. |
| 3,948,285 A | 4/1976 | Flynn |
| 3,967,808 A | 7/1976 | Lieding |
| 3,989,066 A | 11/1976 | Sturman et al. |
| 4,022,239 A | 5/1977 | Schwindt et al. |
| RE29,252 E | 6/1977 | Miller |
| 4,029,119 A | 6/1977 | Klieves |
| 4,034,775 A | 7/1977 | Slagel |
| 4,051,767 A | 10/1977 | Landsberg |
| 4,067,541 A | 1/1978 | Hunter |
| 4,077,424 A | 3/1978 | Ehret et al. |
| 4,105,186 A | 8/1978 | Eby |
| 4,125,124 A | 11/1978 | Kah |
| 4,135,696 A | 1/1979 | Saarem et al. |
| 4,150,685 A | 4/1979 | Van Haaften |
| 4,176,687 A | 12/1979 | Ensign |
| 4,178,954 A | 12/1979 | Klieves |
| 4,180,236 A | 12/1979 | Saarem et al. |
| 4,189,792 A | 2/1980 | Veach |
| 4,199,130 A | 4/1980 | Stoll et al. |
| 4,203,459 A | 5/1980 | Boschung |
| 4,210,169 A | 7/1980 | Palma |
| 4,212,320 A | 7/1980 | Stoll et al. |
| 4,235,254 A | 11/1980 | Kirby |
| 4,253,494 A | 3/1981 | Cooke |
| 4,312,379 A | 1/1982 | Kinder |
| 4,313,455 A | 2/1982 | Pitman |
| 4,316,480 A | 2/1982 | Kah, Jr. |
| 4,323,194 A | 4/1982 | Newbold et al. |
| 4,330,003 A | 5/1982 | D'Alonzo |
| 4,342,424 A | 8/1982 | Meyer et al. |
| 4,353,386 A | 10/1982 | Slagel |
| 4,398,562 A | 8/1983 | Saarem et al. |
| 4,407,451 A | 10/1983 | Hunter |
| 4,452,272 A | 6/1984 | Griswold |
| 4,492,247 A | 1/1985 | Lockwood |
| 4,496,103 A | 1/1985 | Pitchford |
| 4,502,506 A | 3/1985 | Fisher |
| 4,505,450 A | 3/1985 | Saarem et al. |
| 4,523,606 A | 6/1985 | Gould et al. |
| 4,526,198 A | 7/1985 | Scott |
| 4,537,356 A | 8/1985 | Lawson |
| 4,565,235 A | 1/1986 | Fischer et al. |
| 4,585,027 A | 4/1986 | Stillions |
| 4,592,379 A | 6/1986 | Goettl |
| 4,611,617 A | 9/1986 | Hewitt |
| 4,617,992 A | 10/1986 | Abel |
| 4,647,003 A | 3/1987 | Hilpert et al. |
| 4,671,485 A | 6/1987 | Saarem et al. |
| 4,676,264 A | 6/1987 | Wiseman |
| 4,708,264 A | 11/1987 | Bruninga |
| D295,280 S | 4/1988 | Walser |
| 4,744,285 A | 5/1988 | Presley |
| 4,796,657 A | 1/1989 | Baker |
| 4,809,910 A | 3/1989 | Meyer |
| 4,817,661 A | 4/1989 | Howeth |
| 4,838,485 A | 6/1989 | Rinkewich |
| 4,852,802 A | 8/1989 | Iggulden |
| 4,911,401 A | 3/1990 | Holcomb et al. |
| 4,921,002 A | 5/1990 | Christon et al. |
| 4,961,538 A | 10/1990 | Hewitt |
| 5,022,426 A | 6/1991 | Fischer |
| 5,031,875 A | 7/1991 | Zimmerman |
| 5,082,015 A | 1/1992 | Baker |
| 5,082,022 A | 1/1992 | Boundy |
| 5,100,056 A | 3/1992 | Theodorsen et al. |
| 5,104,090 A | 4/1992 | Grizzle et al. |
| 5,118,072 A | 6/1992 | Sakamoto et al. |
| 5,129,620 A | 7/1992 | Castetter |
| 5,158,475 A | 10/1992 | Tyler |
| 5,170,144 A | 12/1992 | Nielsen |
| 5,184,309 A * | 2/1993 | Simpson ............ B67D 7/425 |
| | | 141/392 |
| 5,205,539 A | 4/1993 | Schalk |

(56) References Cited

U.S. PATENT DOCUMENTS

| | | |
|---|---|---|
| 5,207,354 A | 5/1993 | Hsu et al. |
| 5,213,124 A | 5/1993 | Costa |
| 5,230,366 A | 7/1993 | Marandi |
| 5,259,554 A | 11/1993 | Ewing et al. |
| 5,263,680 A | 11/1993 | Laux |
| 5,263,681 A | 11/1993 | Laux |
| 5,263,685 A | 11/1993 | Winnike et al. |
| 5,299,774 A | 4/1994 | Arneson et al. |
| 5,301,710 A | 4/1994 | Marandi |
| 5,301,919 A | 4/1994 | May |
| 5,328,149 A | 7/1994 | Reuter |
| 5,335,688 A | 8/1994 | Caviar |
| 5,406,974 A | 4/1995 | Griswold |
| 5,427,350 A | 6/1995 | Rinkewich |
| 5,433,243 A | 7/1995 | Griswold et al. |
| 5,445,182 A | 8/1995 | Sturman et al. |
| 5,460,076 A | 10/1995 | Pierce et al. |
| 5,487,409 A | 1/1996 | Stoll |
| 5,535,987 A | 7/1996 | Wlodarczyk |
| 5,636,652 A | 6/1997 | Toschi |
| 5,647,397 A | 7/1997 | Heiniger et al. |
| 5,649,562 A | 7/1997 | Sturman et al. |
| 5,682,918 A | 11/1997 | Stoll et al. |
| 5,685,336 A | 11/1997 | Heiniger |
| 5,706,855 A | 1/1998 | Heiniger |
| 5,711,486 A | 1/1998 | Clark et al. |
| 5,746,058 A | 5/1998 | Vertanen |
| 5,762,092 A | 6/1998 | Yang |
| 5,762,270 A | 6/1998 | Kearby |
| 5,796,008 A | 8/1998 | Stoll et al. |
| 5,806,556 A | 9/1998 | Johnson |
| 5,823,505 A | 10/1998 | Stoll et al. |
| 5,853,026 A | 12/1998 | Wlodarczyk et al. |
| 5,879,559 A | 3/1999 | Schreiner et al. |
| 6,007,045 A | 12/1999 | Heiniger et al. |
| 6,050,286 A | 4/2000 | Kruer et al. |
| 6,059,259 A | 5/2000 | Gregoire et al. |
| 6,082,703 A | 7/2000 | Fava et al. |
| 6,102,362 A | 8/2000 | Gerber |
| 6,126,141 A | 10/2000 | Geiger |
| 6,182,941 B1 | 2/2001 | Scheurenbrand et al. |
| 6,220,293 B1 | 4/2001 | Rashidi et al. |
| 6,227,455 B1 | 5/2001 | Scott et al. |
| 6,241,158 B1 | 6/2001 | Clark et al. |
| 6,257,264 B1 | 7/2001 | Sturman et al. |
| D449,872 S | 10/2001 | Lohde et al. |
| 6,298,872 B1 | 10/2001 | Keller et al. |
| 6,299,075 B1 | 10/2001 | Koller et al. |
| 6,311,728 B1 | 11/2001 | Goettl |
| 6,314,999 B1 | 11/2001 | Conn |
| 6,325,087 B1 | 12/2001 | Tarr |
| 6,360,767 B1 | 3/2002 | Barnes |
| 6,386,232 B2 | 5/2002 | Serrano Sanchez et al. |
| 6,394,126 B2 | 5/2002 | Lohde et al. |
| 6,394,412 B2 | 5/2002 | Zakai et al. |
| 6,397,687 B1 | 6/2002 | Garmas |
| 6,416,033 B1 | 7/2002 | McKell et al. |
| 6,484,754 B1 | 11/2002 | Muth et al. |
| 6,491,235 B1 | 12/2002 | Scott et al. |
| 6,499,509 B2 | 12/2002 | Berger et al. |
| 6,539,967 B2 | 4/2003 | Tarr |
| 6,547,214 B2 | 4/2003 | Gregoire |
| 6,612,335 B1 | 9/2003 | Assa et al. |
| 6,622,933 B1 | 9/2003 | Young et al. |
| 6,663,078 B1 | 12/2003 | Stoll et al. |
| 6,679,053 B2 | 1/2004 | Priese |
| 6,708,715 B2 | 3/2004 | Duebel et al. |
| 6,748,970 B2 | 6/2004 | Keller |
| 6,749,136 B1 | 6/2004 | Wilson et al. |
| 6,837,271 B1 | 1/2005 | Saint |
| 6,860,469 B2 | 3/2005 | Kerg et al. |
| 6,874,756 B2 | 4/2005 | Hawkins et al. |
| 6,877,714 B2 | 4/2005 | Hall |
| 6,889,922 B1 | 5/2005 | Knight et al. |
| 6,948,697 B2 | 9/2005 | Herbert et al. |
| 6,986,500 B2 | 1/2006 | Giousouf et al. |
| 7,007,916 B2 | 3/2006 | Lee |
| 7,040,840 B2 | 5/2006 | Zook |
| 7,156,322 B1 | 1/2007 | Heitzman |
| 7,201,187 B2 | 4/2007 | Irwin et al. |
| 7,252,032 B2 | 8/2007 | Scheffel et al. |
| 7,303,147 B1 | 12/2007 | Danner et al. |
| D559,955 S | 1/2008 | Donovan |
| 7,343,845 B2 | 3/2008 | Wirtl et al. |
| 7,380,568 B2 * | 6/2008 | Tiwet .............. G05D 7/005 137/205 |
| 7,392,824 B2 | 7/2008 | Bogdanowicz et al. |
| 7,475,863 B2 | 1/2009 | Donovan |
| 7,503,346 B1 | 3/2009 | Clark |
| 7,503,348 B2 | 3/2009 | Irwin et al. |
| 7,537,437 B2 | 5/2009 | Muramatsu et al. |
| 7,552,906 B2 | 6/2009 | Irwin et al. |
| 7,694,934 B2 | 4/2010 | Irwin |
| D622,226 S | 8/2010 | Crist |
| 7,789,052 B2 | 9/2010 | Ellison et al. |
| 7,793,913 B2 | 9/2010 | Hara |
| 7,806,382 B1 | 10/2010 | Palumbo et al. |
| 7,826,931 B2 | 11/2010 | Lorenz |
| 8,397,745 B2 | 3/2013 | Hurst |
| 8,535,540 B2 | 9/2013 | Chandler, Jr. |
| 8,651,141 B2 | 2/2014 | Giacomini et al. |
| 8,733,672 B2 | 5/2014 | Nations |
| 8,746,591 B2 | 6/2014 | Lichte et al. |
| 9,010,723 B2 * | 4/2015 | Someya ............ H02P 3/02 251/129.01 |
| 2002/0003042 A1 | 1/2002 | Reilly |
| 2003/0030021 A1 | 2/2003 | Hawkins et al. |
| 2005/0109400 A1 | 5/2005 | Glime et al. |
| 2005/0139061 A1 | 6/2005 | Timko et al. |
| 2005/0199292 A1 | 9/2005 | Stedman et al. |
| 2005/0230650 A1 | 10/2005 | Peterson |
| 2007/0187634 A1 | 8/2007 | Sneh |
| 2007/0199600 A1 | 8/2007 | Irwin et al. |
| 2008/0029722 A1 | 2/2008 | Irwin |
| 2009/0126801 A1 | 5/2009 | Grill et al. |
| 2010/0024414 A1 | 2/2010 | Hittle et al. |
| 2010/0072410 A1 | 3/2010 | Lacasse et al. |
| 2010/0161144 A1 | 6/2010 | Crist |
| 2010/0163765 A1 | 7/2010 | Gregoire |
| 2010/0276011 A1 | 11/2010 | Spitzer |
| 2011/0015794 A1 | 1/2011 | Lorenz |
| 2011/0248104 A1 | 10/2011 | Malsam |
| 2011/0284790 A1 | 11/2011 | Ikeda et al. |
| 2011/0308619 A1 | 12/2011 | Martino et al. |
| 2011/0309274 A1 | 12/2011 | Parsons et al. |
| 2013/0180599 A1 | 7/2013 | Hurst |
| 2013/0206242 A1 | 8/2013 | Hurst |
| 2014/0217315 A1 | 8/2014 | Morozumi et al. |

FOREIGN PATENT DOCUMENTS

| | | |
|---|---|---|
| WO | WO 2012124349 A1 | 9/2012 |
| WO | WO 2013/169511 | 11/2013 |

OTHER PUBLICATIONS

Dorot matholding group article on *Irrigation—Hydraulic remote control—Principles and assembly schemes*, downloaded from http://www.dorot.com/index.php?page_id=820, on Jan. 22, 2015, © Dorot 2015 (4 pages).

GEMÜ® product description brochure for Diaphragm Valve, Plastic, Model 693, © Sep. 2014 by GEMÜ Gebr.Müller—Apparatebau GmbH & Co. KT, Ingelfingen-Criesbach, Germany (9 pages).

Humpherys et al., Momentarily-Energized Pilot Valves for Irrigation Systems, *Transactions of the ASAE* (American Society of Agricultural Engineers, St. Joseph, Michigan), pp. 1471-1475, vol. 26, No. 5.

International Search Report and Written Option regarding PCT/US2013/038613, dated Apr. 29, 2013.

(56) References Cited

OTHER PUBLICATIONS

Pohjakas, K., Development of Automated Surface Irrigation, *Canadian Agricultural Engineering*, pp. 72-74, vol. 14, No. 2, Dec. 1972.

* cited by examiner

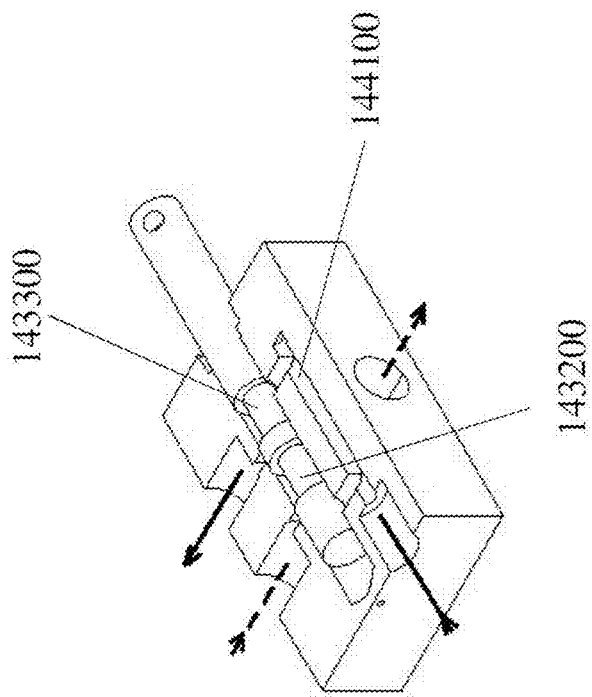
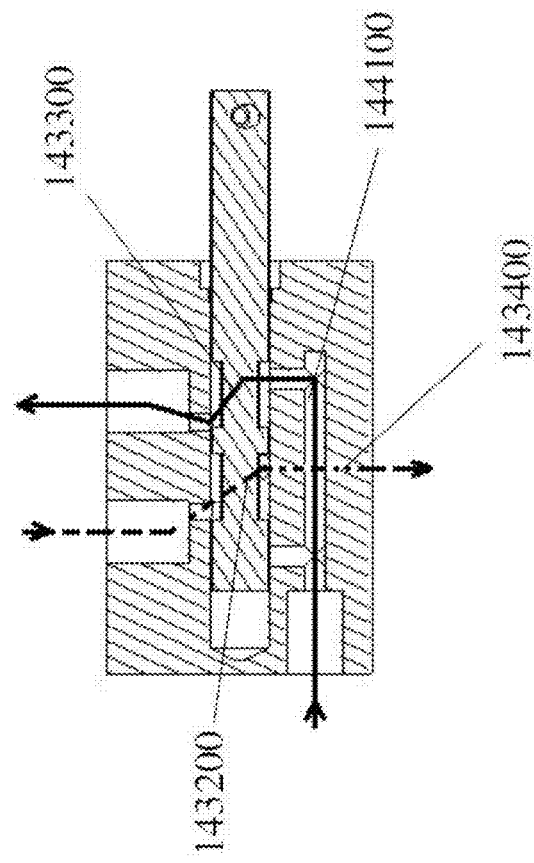
Figure 8

VComm Block Diagram

Polarity Reversing Valve Control
Schematic - Polarity State 1

Polarity Reversing Valve Control
Schematic - Polarity State 2

Polarity Reversing Valve Control
Schematic - Polarity State 3

Polarity Reversing Valve Control
Schematic - Polarity State 4

VALVE CONTROL APPARATUS

INCORPORATION BY REFERENCE TO ANY PRIORITY APPLICATIONS

Any and all applications for which a foreign or domestic priority claim is identified in the application data sheet as filed with the present application are hereby incorporated by reference under 37 CFR 1.57.

FIELD OF THE INVENTION

This invention relates generally to devices and methods for regulating fluid flow.

BACKGROUND OF THE INVENTION

Conventionally, irrigation systems have been implemented which switch between multiple irrigation runs by using an electronic controller that signals solenoids placed on remote valves to activate or shut off fluid flow through each respective valve.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to embodiments of a fluid flow control device whereby an electric circuit receives a control signal which initiates a fluid flow state change in an associated one or more fluid output valves. The fluid flow state change may be associated with an energized motor and an electro-mechanical transition within the device. The regulating device is an improved control valve which may be optionally utilized in fluid applications in which conventional AC and DC solenoid-based valves have been historically used. An aspect of the disclosure relates to a fluid flow control device that eliminates or significantly reduces typical solenoid-based problems (e.g., excessive power consumption, debris clogged fluid passages, freezing weather damage, overheating, and/or the like).

An aspect of the disclosure relates to a fluid regulator, comprising: A fluid regulator, comprising: a shaft configured with at least: a cam, and a crank; an electric motor capable of rotating the shaft; an electric circuit comprising: a capacitor having a first capacitor terminal and a second capacitor terminal, the first capacitor terminal capable of being coupled to a power source and the second capacitor terminal coupled to the electric motor; a switching circuit comprising one or more switches (e.g., an electromagnetic mechanical relay, a solid state relay, a double poll single throw switch, and/or other switches) including at least one relay, the switching circuit having a least one switching circuit terminal coupled to the second capacitor terminal and at least one switching circuit terminal coupled to the electric motor; a first housing, the first housing comprising: a first port that enables a bi-directional fluid path to an output valve, and a second port, wherein the second port is adapted to interface with a fluid source upstream from the output valve; a spool contained within the first housing, the spool in operative communication with the shaft via the crank, wherein the spool is adapted to travel within the first housing; an actuator configured to: open the output valve at least partly in response to: at least one switching circuit switch being opened in response to a current flow through the relay, which causes the electric motor to rotate the shaft towards a first shaft position and movement of the spool towards a first spool position which in turn causes, the cam to interface with the electric circuit, which in turn causes the shaft to stop at the first shaft position and the spool to stop at the first spool position, which enables a first fluid flow from the output valve to the first port; close the output valve at least partly in response to: at least one switching circuit switch being closed in response to a loss of the current flow through the relay, which causes the capacitor to discharge into the electric motor to rotate the shaft to towards a second shaft position and initiate movement of the spool towards a second spool position, which in turn causes, fluid pressure entering via the second port to assist movement of the spool towards a second spool position, which in turn causes, the cam to interface with the electric circuit, which in turn causes the shaft to stop at the second shaft position and the spool to stop at the second spool position, which enables a second fluid flow from the first port to the output valve.

An aspect of the disclosure relates to A fluid regulator, comprising: a shaft configured with at least: a cam, and a crank; an electric motor configured with an electric circuit, the electric motor capable of rotating the shaft; a first housing, the first housing comprising at least a first port configured to enable a bi-directional fluid path to an output valve; a spool contained within the first housing, the spool in operative communication with the shaft via the crank, wherein the spool is capable of travel within the first housing; an actuator configured to: open the output valve at least partly in response to: receipt of a control signal at a first state, wherein the control signal is provided from a remote device, which causes the motor to rotate the shaft towards a first shaft position and movement of the spool towards a first spool position which in turn causes, the cam to interface with the electric circuit, which in turn causes the shaft to stop at the first shaft position and the spool to stop at the first spool position, which enables a first fluid flow from the output valve to the first port; close the output valve at least partly in response to: receipt of the control signal at a second state, wherein the control signal is provided from the remote device, which causes the electric motor to rotate the shaft towards a second shaft position and movement of the spool towards a second spool position, which in turn causes, the cam to interface with the electric circuit, which in turn causes the shaft to stop at the second shaft position and the spool to stop at the second spool position, which enables a second fluid flow from the first port to the output valve.

A fluid regulator, comprising: a shaft configured with at least: a cam, and a crank; an electric motor configured with an electric circuit, the electric motor capable of rotating the shaft; a first housing, the first housing comprising at least: a first port configured to enable a bi-directional fluid path to a first set of output valves, and a second port configured to enable a bi-directional fluid path to a second set of output valves; a spool contained within the first housing, the spool in operative communication with the shaft via the crank, wherein the spool is capable of travel within the first housing; an actuator configured to: open the first set of output valves and close the second set of output valves at least partly in response to: receipt of a control signal at a first state, wherein the control signal is provided from a remote device, which causes the motor to rotate the shaft towards a first shaft position and movement of the spool towards a first spool position which in turn causes, the cam to interface with the electric circuit, which in turn causes the shaft to stop at the first shaft position and the spool to stop at the first spool position, which enables: a first fluid flow from the second port to the second set of output valves, and a second fluid flow from the first set of output valves to the first port; close the first set of output valves and open the second set of output valves at least partly in response to: receipt of the control signal at a second state, wherein the control signal is provided from the remote device, which causes the electric motor to rotate the shaft towards a second shaft position and movement of the spool towards a second spool position, which in turn causes, the cam to interface with the electric circuit, which in turn causes the shaft to stop at the second shaft position and the spool to stop at the second spool position, which enables: a third fluid flow from the first port to the first set of output valves, and a fourth fluid flow from the second set of output valves to the second port.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIG. 8 illustrates a cross-sectional view of an example embodiment of a fluid switching element of a fluid control switch.

DETAILED DESCRIPTION

Conventional irrigation systems switch between multiple irrigation runs by using an electronic controller that signals solenoids placed on remote valves to activate or shut off fluid flow through each respective valve. This system architecture requires installation of electrical cables from the controller to each solenoid-based valve. Thus, both flow control and timer control mechanisms are conventionally required to distribute a single source of fluid through a system of lines. Such conventional systems are costly to purchase and install and are subject to a relatively high rate of device and solenoid failure.

Installation of conventional fluid distribution systems requires replacing or removing existing valve systems and replacing them with a complicated, failure prone, control device. The complexity of such conventional control devices requires precise manufacturing standards to ensure functionality and results in increased cost of purchase, operation, and maintenance, thus, increasing warranty replacement costs and detrimentally affecting customer goodwill.

Thus, there exists, in agricultural applications as well as in commercial (e.g., golf course) and industrial applications (e.g., oil and gas), a need for a fluid control device capable of managing fluid delivery area in new and/or existing systems, optionally utilizing an existing timing controller, and that may optionally be configured to be installed at a location distant from an electrical source. Certain aspects of the disclosure herein relate to systems and methods for fluid control devices capable of managing fluid delivery area in new and/or existing systems, optionally utilizing an existing timing controller, and that may optionally be configured to be installed at a location distant from an electrical source As used herein the term fluid means any liquid capable of distribution. Illustratively, water, milk, juice, aqueous buffer, solvent, organic or inorganic liquids, gas, air, fluidized solid, slurry, liquid that contains particulate matter, solvated chemicals, or other molecule or material that requires distribution are fluids. For convenience, although the term "water" may be used herein with respect to examples of a flow control system, it is appreciated that the flow control system is independent of the fluid that is delivered, and a person having ordinary skill in the art recognizes that enablement for one liquid enables one to make and use embodiments described herein with any fluid.

The content of U.S. patent application Ser. No. 15/075,663, titled FLUID ACTIVATED FLOW CONTROL APPARATUS, filed Mar. 21, 2016 is incorporated herein by reference in its entirety, including, without limitation, FIGS. 1-144 and the accompanying description of each figure.

Electric Motor Fluid Switch with Spool Piston

Figure 2:
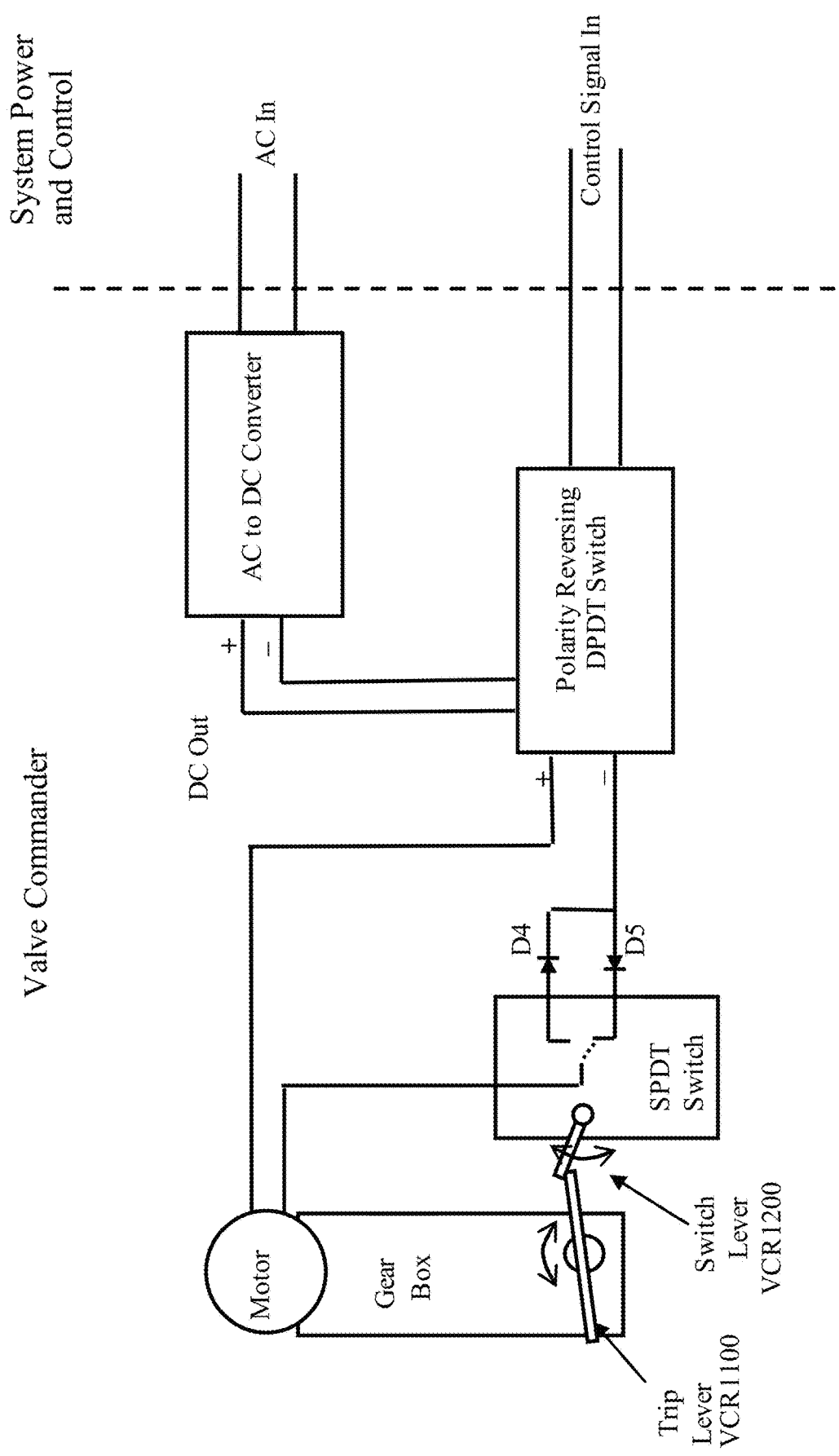
FIG. 2 illustrates a schematic of an example embodiment of a valve control using a reversible motor configuration with a trip lever in a second position.
Figure 3:
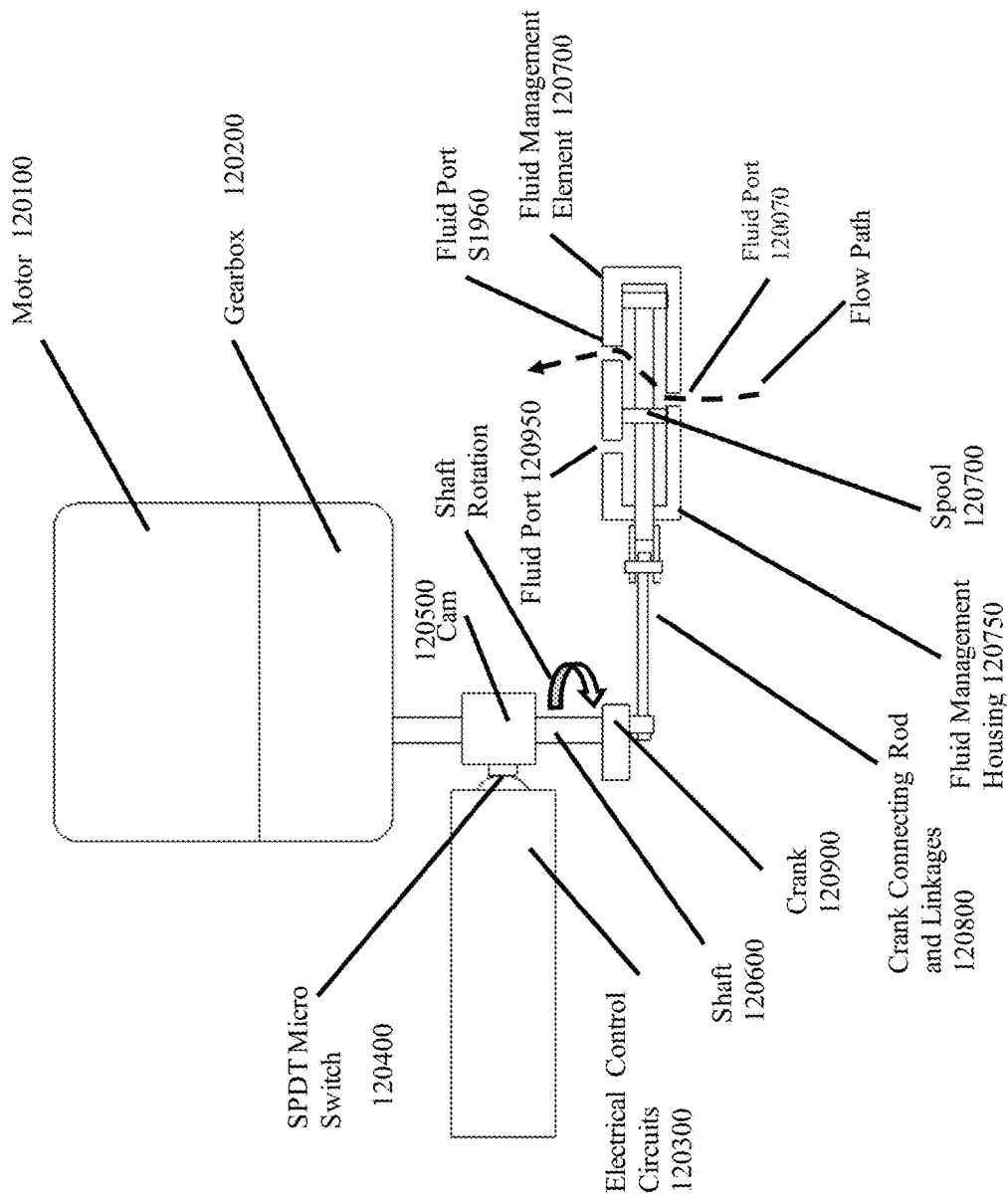
FIG. 3 further depicts an example embodiment of an Electric Motor Fluid Switch Spool, with a cross section view of the fluid control subassembly.

In the EM fluid switch example embodiment described above, shaft rotations enable the alignment of fluid ports within internal fluid passages of the fluid management subsystem of the apparatus. In another EM fluid switch example embodiment, fluid is directed amongst fluid passages and/or external ports via linear motion of a sliding piston (e.g., a spool piston, including a piston with grooves enabling fluid passages across portions of the piston as described herein) as illustrated in FIGS. 2 and 3. (Note the elements of the apparatus illustrated in FIGS. 119 and 120 are the same.) For clarity, the description herein may refer to a spool piston, which is intended to encompass both spool valves and rotary pilot valve or other types of valves which enable a redirection of fluid and/or enabling of one or more fluid passages in response to an action or force on an element of the valve (e.g., spool piston), unless the context indicates otherwise.

In an example embodiment of an EM fluid switch spool (EM fluid switch S), the EM fluid switch S includes an electric motor 120100, a gearbox 120200, an electric control circuit 120300, a micro switch 120400, shaft 120600, and cam/cog wheel with posts 120500, as similarly described above with respect to the EM fluid switch. For example, the electric motor 120100, gearbox 120200, and electronic control circuit 120300 is optionally the same motor, gearbox, and electronic circuit of the EM fluid switch described herein above. In this example embodiment of an EM fluid switch S, the shaft includes a crank 120900. The fluid management element 120700 interfaces to the electric motor element via a rod 120800 linked to the crank 120900 at one end and the spool piston 120700 at the other end. The fluid management element includes a fluid management body 120750 and a spool 120700 wherein the fluid management body includes a Fluid Port 120950, a Fluid Port 120960, and a Fluid Port 120970. Optionally, the electric motor is manufactured and/or user configured with an associated set of gears or a gearbox 120200. The gears may be configured to enable an increase in torque applied to the shaft (e.g., shaft 120600). This torque may be configured so as to provide adequate force to overcome the friction of the shaft in contact with the housing and to overcome any friction forces and fluid pressure forces in the spool piston assembly. Additionally, a high gear ratio (e.g., 50:1) may be provided that enables the motor, when turned off, to have several wind down revolutions, caused by rotor inertia, without significantly affecting the spool functional position.

EM Fluid Switch S with On/Off Control

Figure 4:
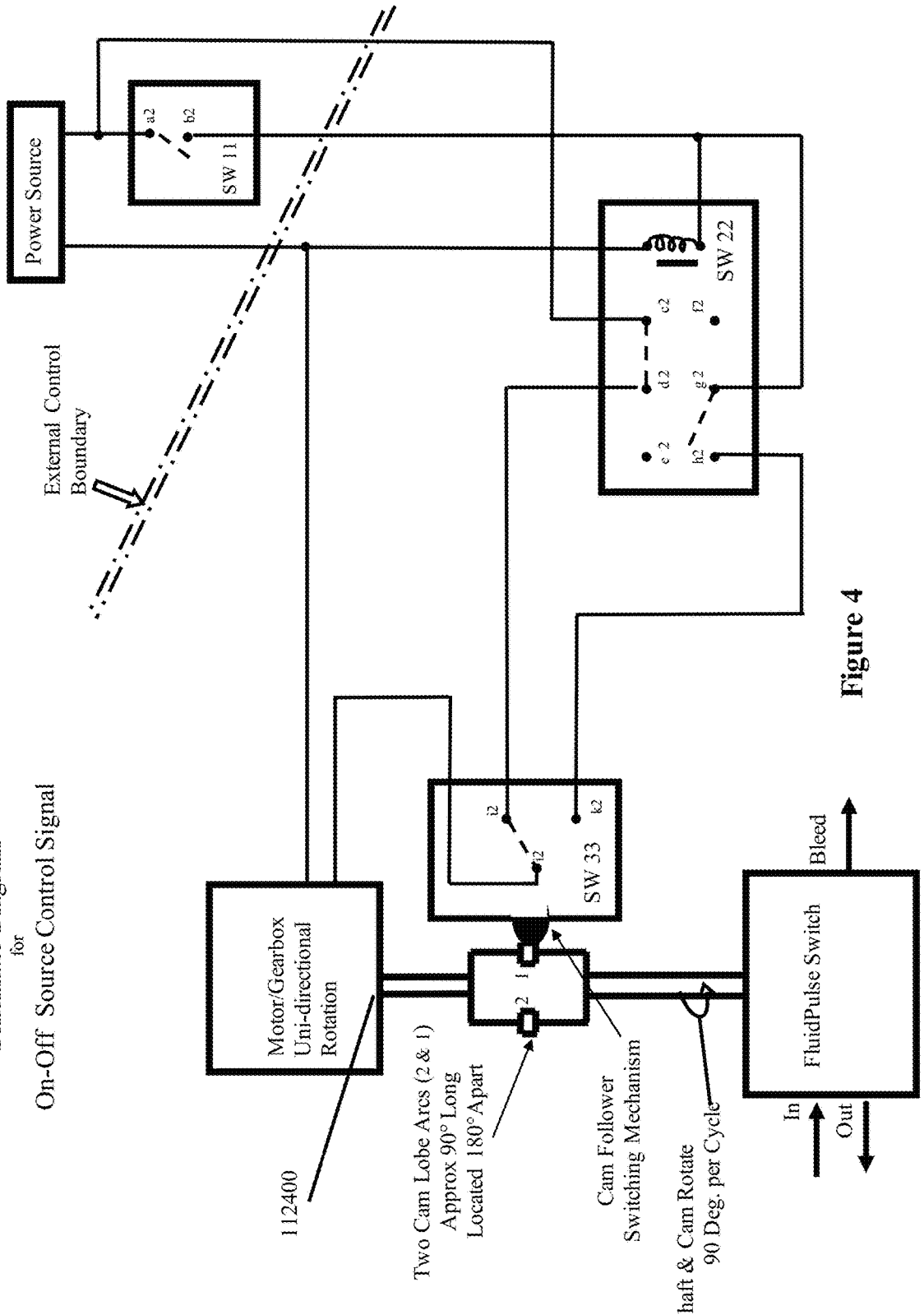
FIG. 4 illustrate an example embodiment of an on/off controlled Electric Motor Fluid Switch.
Figure 5:
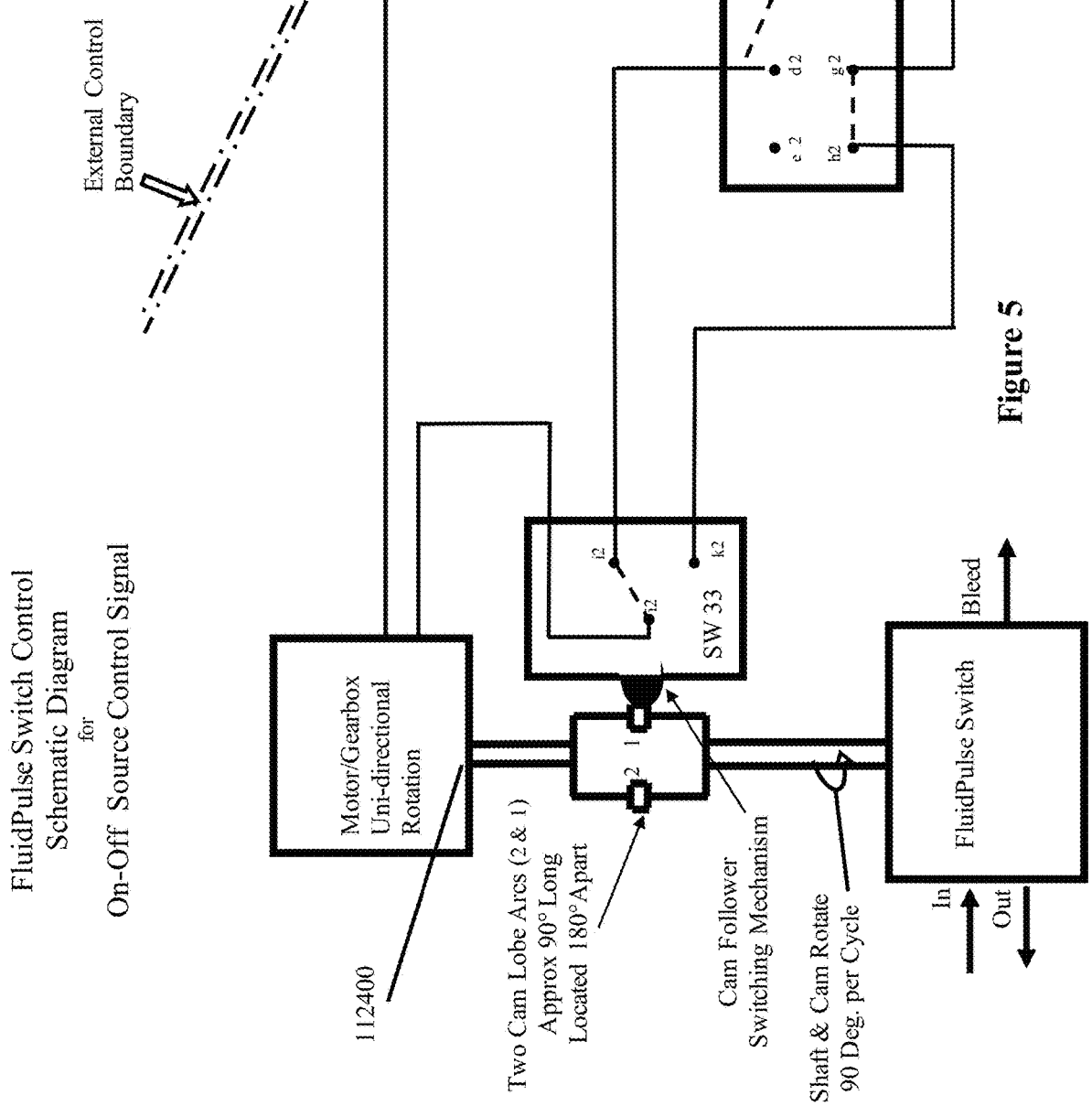
FIG. 5 illustrate an example embodiment of an on/off controlled Electric Motor Fluid Switch.

In an example embodiment, an EM fluid switch S state change is initiated in response to a receipt of an electronic control signal. In this example embodiment, the source control signal state change (e.g., four states) is triggered by an electrical control signal on/off transition as similarly described above herein for the EM fluid switch. Optionally, the same electrical schematic diagram illustrated in FIGS. 4 and 5 is used in the EM fluid switch S example embodiment.

In an example embodiment, in State 1, the external control signal is in the off state. In State 1, the motor is running based at least in part on an energized circuit including a circuit path from the power source to the external closed relay circuit c2-d2 of SW22 and the closed circuit j2-i2 of limit switch SW33, see FIG. 4. The relay may optionally be an electromechanical relay with a coil, a movable armature, and a set of contacts (e.g., two contacts). The relay may optionally be a solid state relay with no movable components. The energized circuit causes the powered electric motor to rotate the shaft 120600. In State 1, a first lobe (e.g., Lobe 1) of a cam of the shaft 120600 interfaces with a limit switch SW22 and continues to interface with the limit switch SW22 through a 90 degree rotation of the shaft 120600.

In State 2, as the shaft 120600 rotation approaches 90 degrees the first lobe disengages from the interfacing limit switch SW22 causing the powered State 1 circuit to open via an open j2-i2 circuit/path. In State 2, the limit switch SW22 also closes the k2-i2 circuit/path. In State 2, the open circuit causes the running electric motor and connected shaft 120600 to stop in a first position. In the first position, the crank causes the spool 120700 to be positioned to the left as illustrated in FIG. 2. The spool 120700 in the first position enables external control fluid to enter fluid port 120950, pass through the fluid management subsystem, and exit an open fluid port 120970 while blocking fluid port 120960. The control fluid exiting the fluid port 120970 enters an associated output valve(s) (e.g. via an external fluid passage such as a tube) to cause, at least in part, the output valve(s) to close (the "off" state, as described herein above).

In State 3, the control signal is switched to the on state (SW11) causing the closure of the circuit a2-b2 of SW11. The control switch SW11 closure causes current passing through the relay switch SW22 to open circuit c2-d2 and close circuit g2-h2. The closure of circuit g2-h2 enables an energized circuit to power the electric motor to rotate the shaft 120600. The energized circuit powering the motor in State 3 comprises, at least in part, a circuit path from the power source through the closed circuit connection a2-b2 of external switch SW11, the closed circuit connection g2-h2 of relay switch SW22, and the closed circuit connection k2-j2 of limit switch SW33, see also FIG. 5. In State 3, a second lobe (e.g., Lobe 2) interfaces with the limit switch SW22 and continues to interface with the limit switch SW22 through a 90 degree rotation of the shaft 120600.

In State 4, as the shaft 120600 rotation approaches 90 degrees the second lobe disengages from the interfacing limit switch SW22 causing the energized circuit to open via an opening of the k2-i2 circuit/path. In State 4, the limit switch SW22 also closes the j2-i2 circuit/path. In State 4, the open circuit causes the running electric motor and connected shaft 120600 to stop in a second position. In the second position, the crank causes the spool 120700 to be positioned to the right as illustrated in FIG. 3. The spool 120700 in the second position enables external fluid to exhaust from the diaphragm chamber of the associated output valve(s) through fluid port 120970 and bleed port 120960 while closing input control fluid port 120950. The exhausting of fluid from the diaphragm chamber of the output valve(s) causes, at least in part, the output valve(s) to open (the "on"

state, as described herein above). In this example embodiment, the shaft first position and shaft second position are offset by 180 degrees. A subsequent control signal causes the above described 4 State cycle to repeat.

Figure 6:
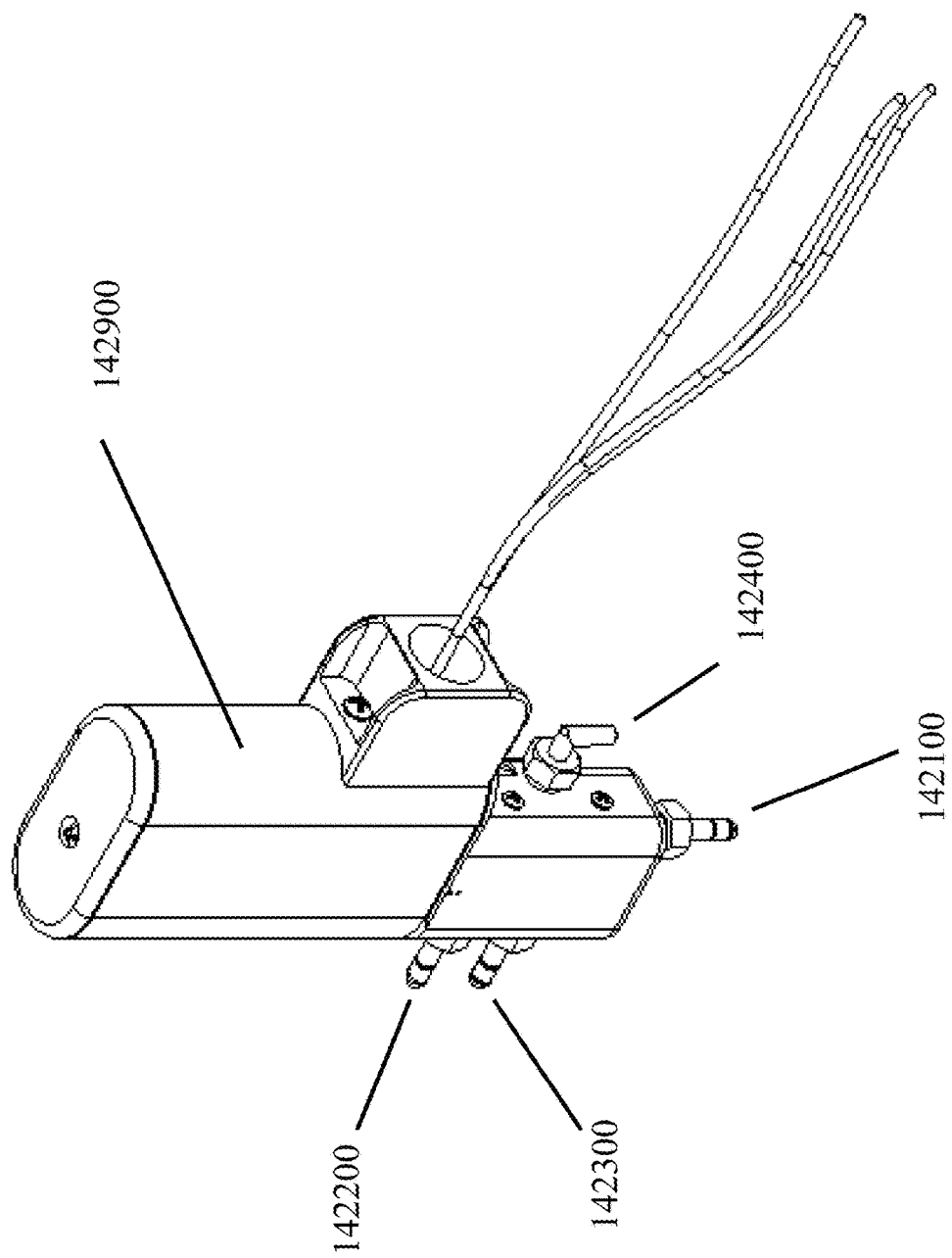
FIG. 6 illustrates an example embodiment of an electric motor, fluid control switch.

Certain fluid systems, such as a BOOMBACK center pivot irrigation system or other fluid system, may conventionally require separate control of multiple sets of output valves (e.g., wherein a set of output valves comprises a single output valve or a plurality of output valves) typically requiring a plurality of solenoids. In contrast to such conventional systems, optionally, an electric motor fluid switch as disclosed herein may be configured and utilized to efficiently and cost effectively to control valves and irrigation. FIG. 6 illustrates an example of such an electric fluid switch, as illustrated in the example embodiment illustrated in FIG. 6.

FIG. 6 illustrates certain aspects of the electric motor fluid switch assembly which may be used for multiple set output valve control applications. Upstream fluid may be used as a control fluid to facilitate the actuation of the sets of output valves. In this example embodiment, the upstream fluid enters the assembly housing at the fluid port 142100. Fluid port 142200 is fluidly connected to the diaphragm bonnet on a first output valve or a first set of output valves. Fluid port 142300 is similarly fluidly connected to the diaphragm bonnet on a second output valve or a second set of output valves. In another aspect of the assembly, vent port 142400 provides a fluid vent for both the first and second output valve and/or first and second set of output valves. In this example embodiment, fluid venting occurs when bonnet pressurization is removed/terminated. The fluid pressure applied to the bonnet is managed by the electric motor fluid switching mechanism as further described below. FIGS. 143 and 144 illustrate control fluid management with solid lines indicating upstream control fluid flow and dashed lines indicating venting fluid flow.

Figure 7:
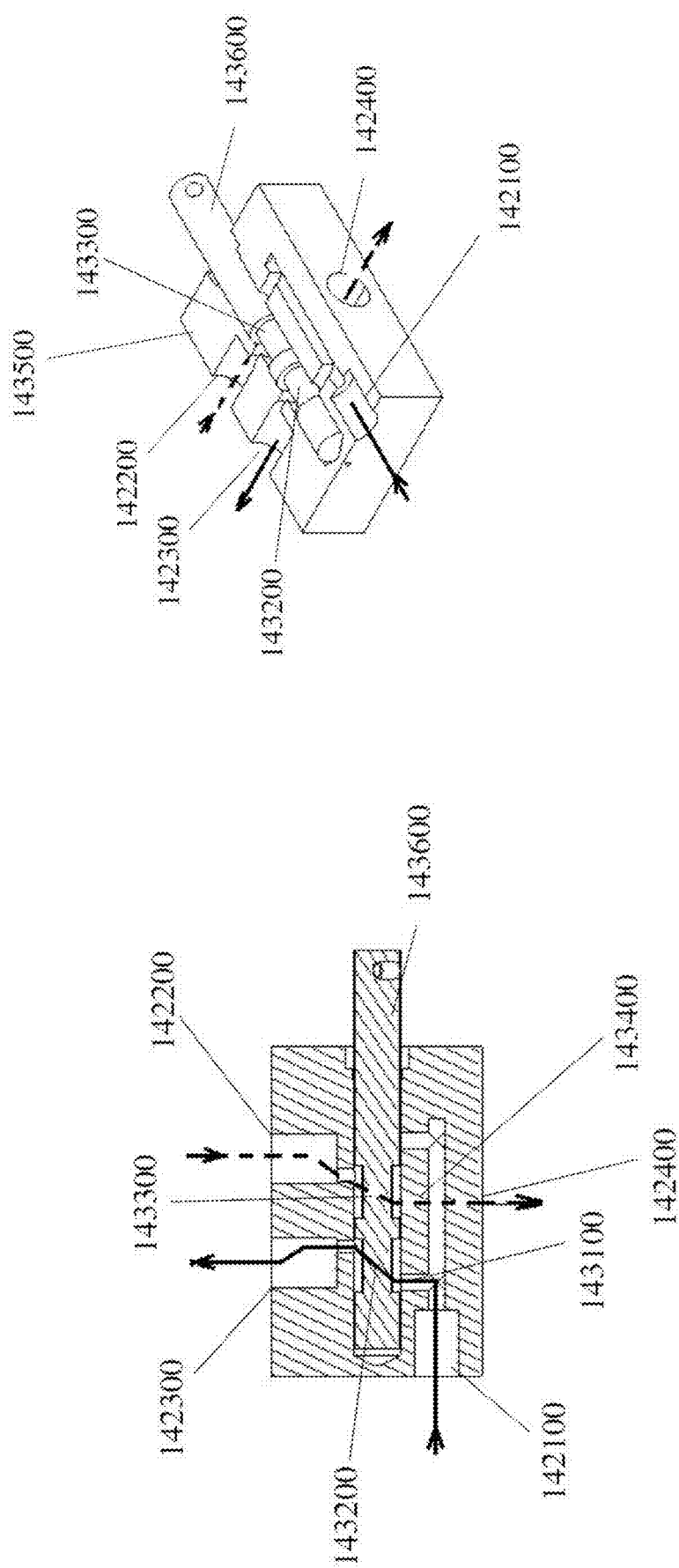
FIG. 7 illustrates a cross-sectional view of an example embodiment of a fluid switching element of a fluid control switch.

FIG. 7 illustrates spool piston 143600 in a state positioned to the far left. As previously described above, the spool piston position/state changes in response to an electrical signal which causes the motor activation enclosed in housing 142900 to apply a force on the spool piston. In this far left state, the spool piston grooves line up to affect a first fluid passage comprising: control fluid input port 142100, internal fluid passage 143100 leading to the spool piston chamber, the spool groove 143200, and bi-directional port 142300 fluidly connected to the second output valve/set of output valves. In this far left state, the spool piston grooves also create a second fluid passage comprising: bi-direction port 142200 leading to the first output valve/set of output valves, the spool piston groove 143300, the internal fluid passage 143400 leading from the spool piston chamber, and the vent port 141400. When the spool piston position/state is to the far left, upstream control fluid traverses the first fluid passage and enters, for example via a fluid connection from output port 142300, the second output valve or second set of output valves causing, at least in part, the second output valve/set of output valves to close (e.g., via fluid entering the bonnet diaphragm chamber causing the valve to close). Also, when the spool piston position/state is to the far left, fluid is vented (e.g., to ambient) from the first output valve/set of output valves through the second fluid passage causing, at least in part, the first output valve/set of output valves to open (e.g., via fluid exiting the bonnet diaphragm chamber causing the valve to open).

FIG. 8 illustrates spool piston 143600 in a state positioned to the far right. As previously described above, the spool piston position/state changes in response to an electrical signal which causes the motor activation enclosed in housing 142900 to apply a force on the spool piston. In this far right state, the spool piston grooves line up to affect a third fluid passage comprising: control fluid input port 142100, internal fluid passage 144100 leading to the spool piston chamber, the spool groove 143300, and bi-directional port 142200 fluidly connected to the first output valve/set of output valves. In this far right state, the spool piston grooves also creates a fourth fluid passage comprising: bi-direction port 142300 leading to the second output valve/set of output valves, the spool piston groove 143200, the internal fluid passage 143400 leading from the spool piston chamber, and the vent port 141400. When the spool piston position/state is to the far right, upstream control fluid traverses the third fluid passage and enters, for example via a fluid connection from output port 142200, the first output valve or second set of output valves causing, at least in part, the first output valve/set of output valves to close (e.g., via fluid entering the bonnet diaphragm chamber causing the valve to close). Also, when the spool piston position/state is to the far right, fluid is vented (e.g., to ambient) from the second output valve/set of output valves through the fourth fluid passage causing, at least in part, the second output valve/set of output valves to open (e.g., via fluid exiting the bonnet diaphragm chamber causing the valve to open).

Valve Commander

Figure 9:
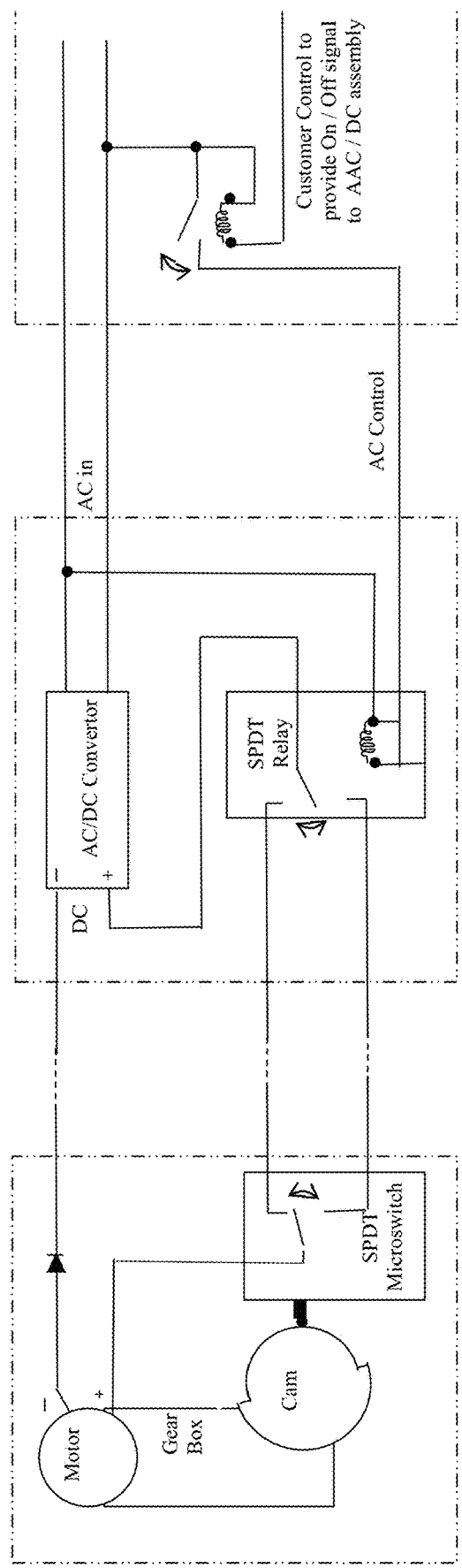
FIG. 9 illustrates a block diagram view of an example embodiment of a fluid control switch.

FIG. 9 illustrates a block diagram of another example embodiment of an Electric Motor fluid switch with Spool Valve or a Valve Commander abbreviated as VComm ("Electric Motor fluid switch with Spool Piston," "Valve-Commander, Vcomm fluid regulator," and "Vcomm" are used interchangeably herein). FIG. 9 illustrates a VComm installation where control implemented using an on/off switch, such as may be typically used with solenoid-based operation. An AC/DC convertor can be provisioned with the VComm unit to interface with AC control circuitry.

The disclosed VComm fluid regulator is an improved electric control valve intended for use in fluid applications in which conventional AC and DC solenoid-based valves have been historically used. These conventional solenoid-based valves have operational problems, such as including excessive power consumption, are prone to plugging with debris, prone to damage from freezing, and are prone to failure caused by overheating.

FIG. 9 further illustrates the novel use of a Single Pole, Double Throw (SPDT) switch operated by a cam. In this example, a two-level cam is utilized, with a high portion lobe VC3a200 as further illustrated in FIG. 12. This schematic is distinct from certain earlier example embodiments which comprised Single Pole Single Throw (SPST) switches and multi-lobe cams.

Figure 10:
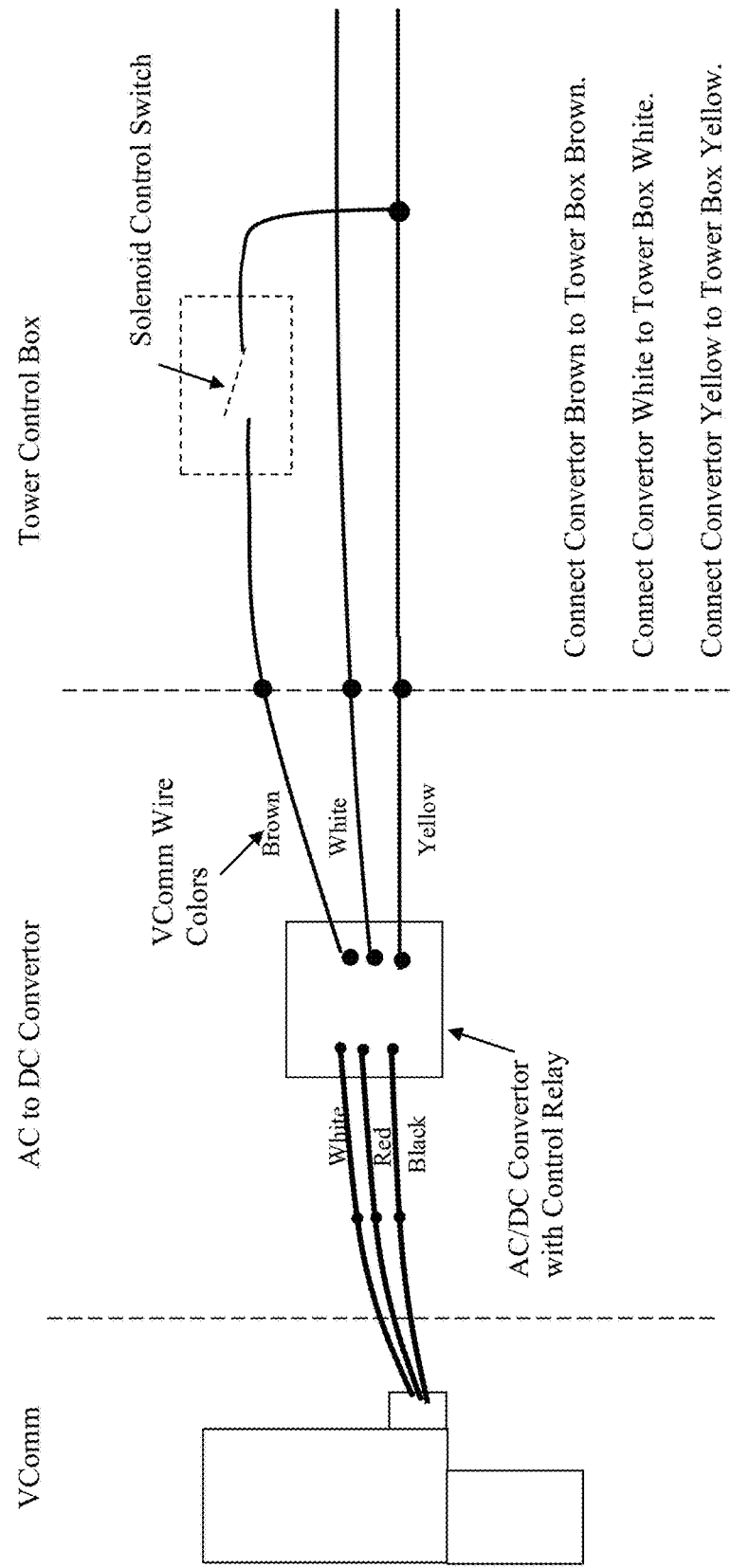
FIG. 10 illustrates an example embodiment wired connection of a fluid control switch to a conventional agricultural center pivot controller.

FIG. 10 illustrates an example electrical connection to solenoid controller. In this example, the solenoid controller is an agricultural center pivot solenoid controller. In this example embodiment, the device controller is an on/off switch type controller suitable for solenoid-based operation. An AC-DC convertor can be optionally provided with the VComm unit to interface with AC control circuitry. The solenoid control switch may be mounted in a tower control box and the switch may be connected to the AC/DC converter and control relay. FIG. 9 illustrates the details of an example embodiment of power conversion, wherein a power converter and relay are configured as an individual assembly. The individual assembly electrically interfaces with the user control system/system controller. This scheme is also compatible with other AC valve controllers.

Figure 11:
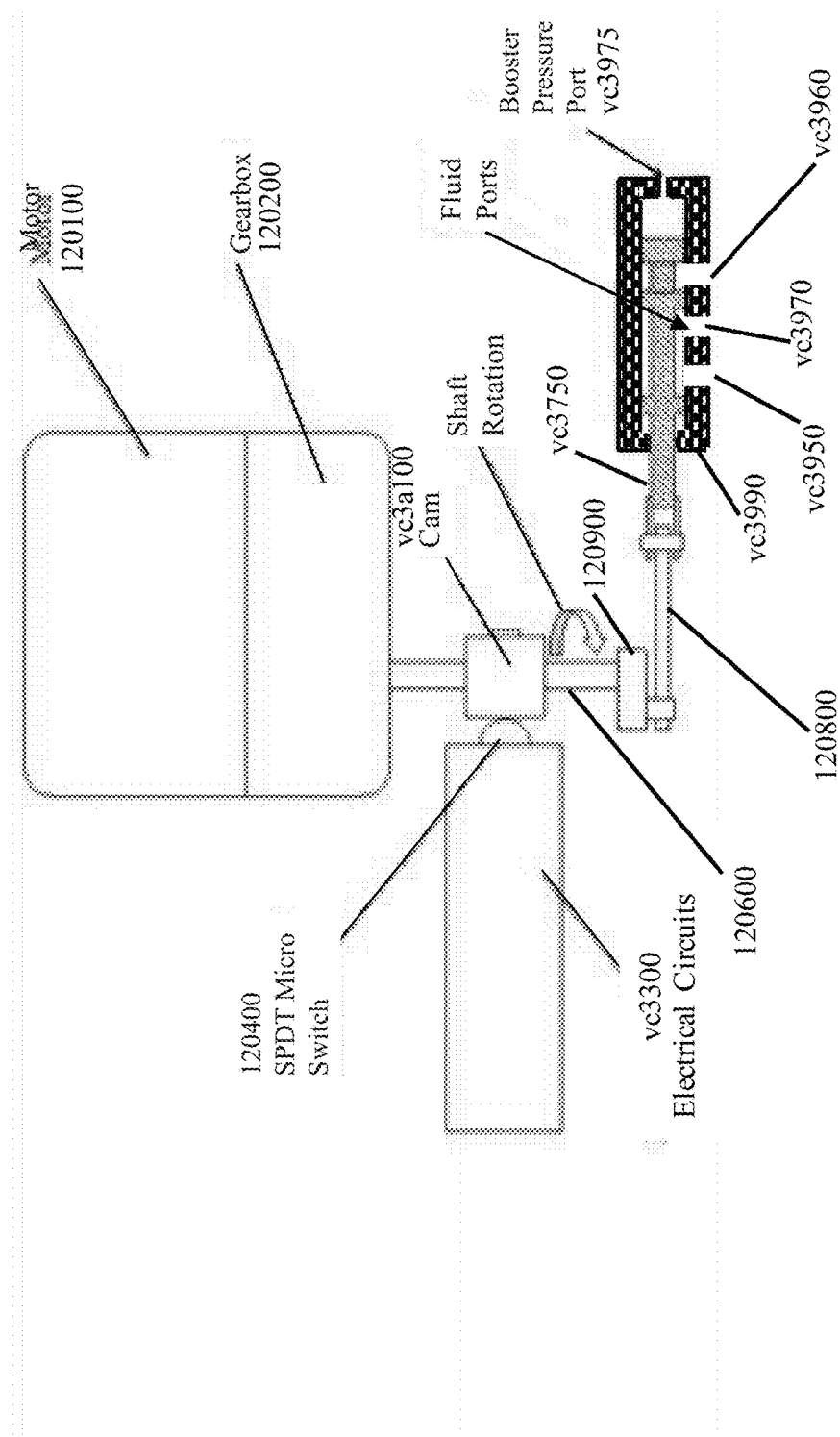
FIG. 11 illustrates an example mechanical schematic representation of an example embodiment of a fluid control switch.

A mechanical schematic representation of a VComm example embodiment is illustrated in FIG. 11. The example embodiment includes an electric motor 120100, a gearbox 120200, an electric circuit(s) VC3300, a SPDT micro switch 120400, shaft 120600, and cam VC3*a*100 (further illustrated in FIG. 12). In this embodiment, the electric motor 120100, gearbox 120200, and shaft 120600 are optionally the same motor, gearbox, and shaft of the EM fluid switch S described herein above. In this example embodiment of a VComm, the shaft includes a crank 120900 and connecting rod and linkages 120800. The fluid management element interfaces to the electric motor via a linked rod 120800 to the crank 120900 at one end and the internal spool element VC3750 at the other end. The fluid management element includes a fluid management housing VC3740, a spool VC3750, an upstream fluid port VC3950, a fluid valve bonnet port VC3960, and a fluid vent port VC3970. In the example embodiment, the fluid port VC3950 is in fluid communication with the upstream fluid path of the associated output valve(s) to be controlled by the VComm. In the example embodiment, the fluid port VC3970 is in fluid communication with the bonnet chamber (e.g., an output valve chamber used as a means to turn the output valve on/off) of the associated output valve(s) to be controlled by the VComm. In the example embodiment, the fluid port VC3960 enables the venting of fluid from the bonnet chamber of the associated output valve(s) to ambient. Optionally, the spool element VC3750 is configured with a plurality of axially configured seals (e.g., O-rings or other suitable seals) to prevent or inhibit fluid flow/leakage outside of intended fluid channels formed by the spool element VC3750 and the spool valve housing VC3740. Optionally, the electric motor 120100 is manufactured and/or user configured with an associated set of gears or a gearbox 120200. The gears may be configured to enable an increase in torque applied to the shaft (e.g., shaft 120600). This torque may be configured so as to provide adequate force to overcome the friction of the spool VC3750 in contact with the housing VC3740 and fluid pressure forces in the housing VC3740. Additionally, a high gear ratio (e.g., 50:1) may be provided that enables the motor, when turned off, to have several wind down revolutions, caused by rotor inertia, without significantly affecting the spool functional position. FIG. 11 also illustrates a booster pressure port VC3975 which may be used to facilitate the reset of the spool element VC3750 as further described below.

Figure 12:
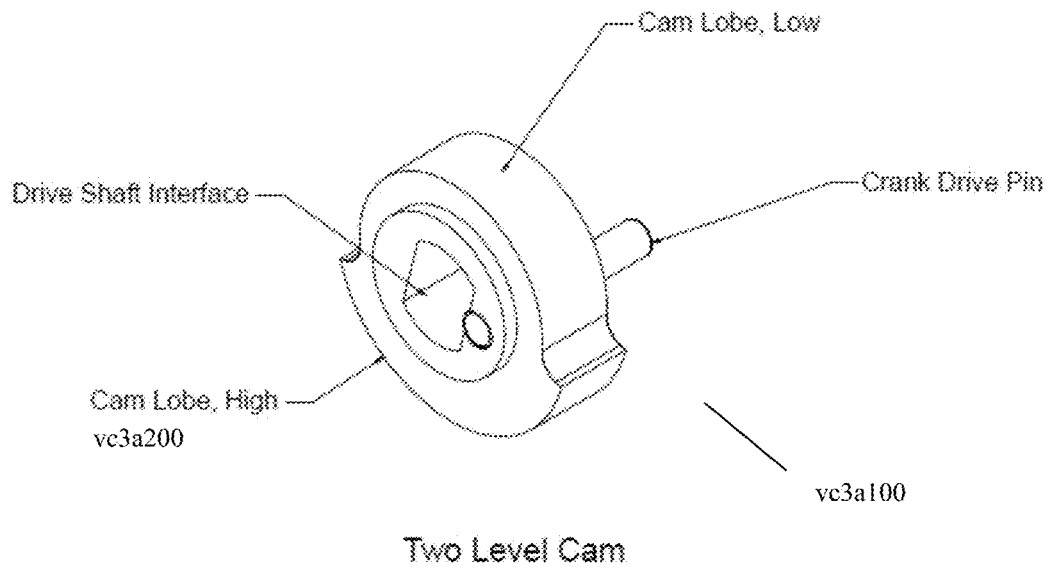
FIG. 12 illustrates an example two-level cam which can be used in an example embodiment of a fluid control switch.

FIG. 12 illustrates an example two level cam with a high lobe wherein the high lobe comprises approximately 180 degrees of the circumference of the cam. Optionally the illustrated cam can be described as a single lobe cam with a 180 degree lobe.

Figure 13:
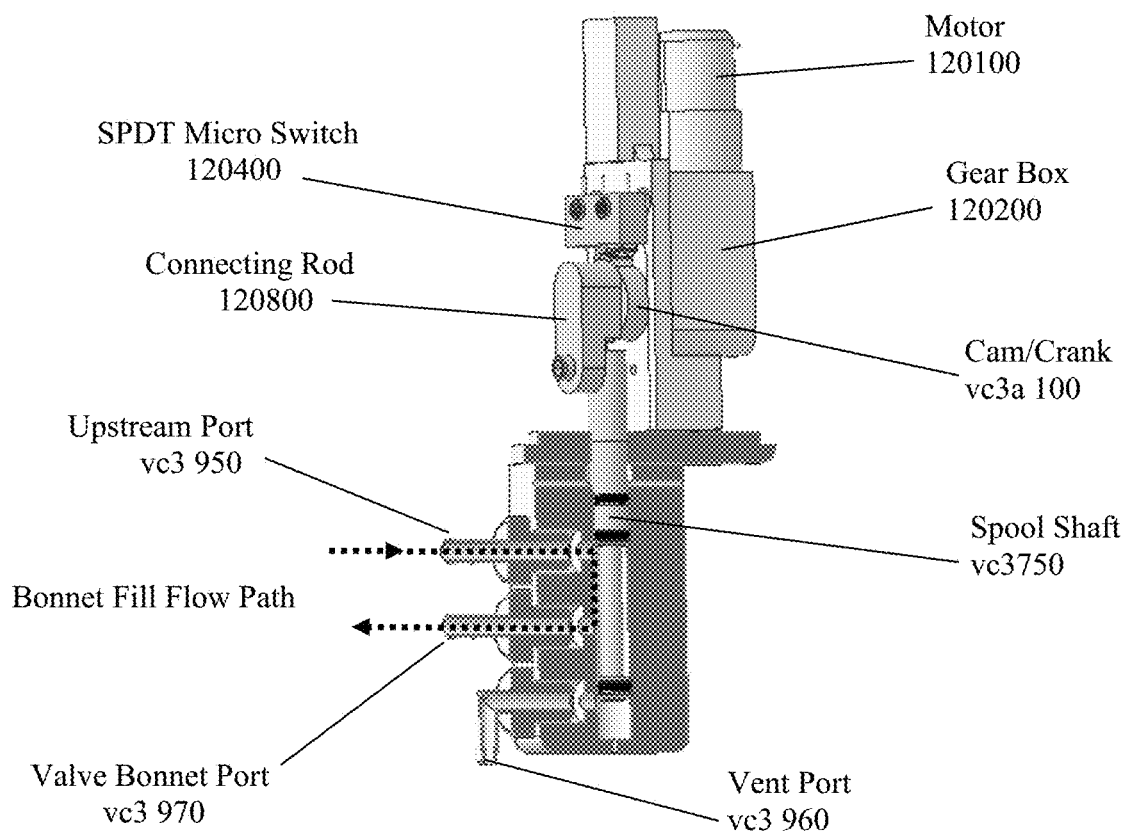
FIG. 13 illustrates an example mechanical schematic representation of an example embodiment of a fluid control with a partial cutaway further illustrating a fluid flow through the device in a given state.

FIG. 13 illustrates an example mechanical configuration of a VComm unit. FIG. 13 illustrates, via a cutaway portion, a spool valve positioning enabling fluid under pressure to fill an associated output valve(s). The arrowed dashed line illustrates the fluid flow communication path from an upstream fluid source to an output valve bonnet chamber.

Figure 14:
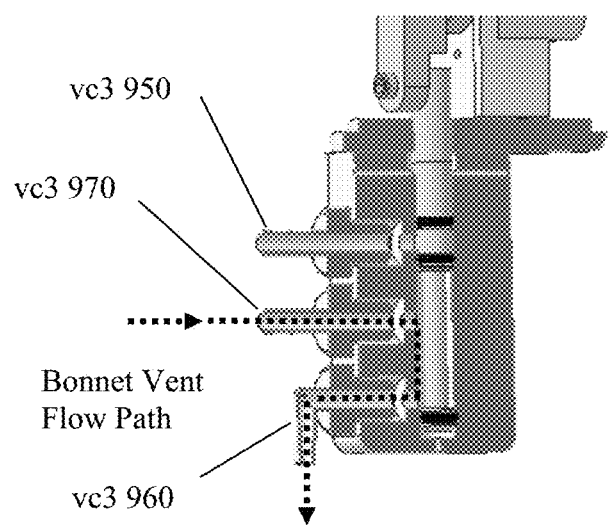
FIG. 14 illustrates an example mechanical schematic representation of an example embodiment of a fluid control with a partial cutaway further illustrating a fluid flow through the device in a given state.

FIG. 14 illustrates an example mechanical configuration of a VComm unit. FIG. 14 illustrates, via a cutaway portion, a spool valve positioning enabling a fluid vent from an associated output valve(s). The arrowed dashed line illustrates the fluid flow communication venting path from an associated output valve bonnet.

Braking

There are certain scenarios in which a motor driven crank may disadvantageously overshoot a desired shaft position. This may be caused, for example, by over voltage applied to the motor which may cause a shaft overshoot. Optionally, the device is configured with one or more gears to provide a sufficiently high gear reduction ratio to enable several wind down revolutions of the motor armature subsequent to a power shutoff resulting in only a few degrees of output shaft rotation. A few degrees of output shaft overshoot advantageously translate into insignificant and predictable linear motion of the valve ports.

Optionally, in an example embodiment, if the voltage is so high that the resulting overshoot exceeds a threshold, the wind down revolutions can be excessive, resulting in port misalignment. When the motor is disconnected from the power source the resulting wind down rotations of the armature generate a voltage of opposite polarity to that of the normal operating power source. This back electro-magnetic force can be used to act as a brake when the motor terminals are connected by a diode that allows the generated opposite polarity current to flow in the opposite direction through the motor windings thus acting to resist its rotation. When normal operating voltage is applied the diode blocks flow through its circuit path which allows normal operation of the motor.

Advantageously, the example VComm design accommodates modest variations in rotation undershoot and overshoot via gearing and the spool valve port tolerances to prevent port misalignment and/or port leakage. Importantly, by design, rotation variances are not cumulative during operation in this example embodiment.

Integrated Electric Charge Storage Device

Control of the VComm unit can be as simple as turning the power on or off, thus needing only two wires in an associated controller. The term wire, as used herein, contemplates a single flexible electrically conductive strand or rod, or multiple conductive strands or rods connected in parallel. Power on may set the VComm port settings into a first position and power off sets them into a second position. Optionally, to accomplish this, a capacitor (or other electronic component capable of storing an electrical charge such as a battery) is continually charged to full (or other) storage capacity during the power on segment of VComm operation (including when the motor is turned off by the cam operating a switch such as SPDT micro-switch S3, although other switch types may be used). When the power is turned off, the capacitor C1 discharges through the motor to move the port settings to the next position and will then be ready for recharge when power is again turned on.

Advantageously, as illustrated by the examples in FIGS. 15-18, a capacitor within an electric circuit of a VComm assembly enables valve control with a conventional two-wire AC power supply. When the AC supply is turned on, the VComm unit transitions to a valve flow "on" state and when the AC supply is turned "off," the VComm transitions to an associated valve flow "off" state.

In an example embodiment of a VComm unit, the VComm unit includes electric motor 120100, gearbox 120200, an electric circuit(s) illustrated in FIGS. 15-18, SPDT switch S3 120400 (which may be a micro switch), shaft 120600, and cam VC3*a*100, as similarly described above with respect to the EM fluid switch. In this example embodiment of a VComm unit, the shaft includes a crank 120900. A fluid management element interfaces to the electric motor via a linked rod 120800 to the crank 120900 at one end and the spool piston VC3750 at the other end. The fluid management element includes a fluid management body VC3990 and a spool VC3750, wherein the fluid management body includes a Fluid Port VC3950, a Fluid Port VC3970, and a Fluid Port VC9360. Optionally, the electric motor is manufactured and/or user configured with an associated set of gears or a gearbox 120200. The gears may be configured to enable an increase in torque applied to the shaft (e.g., shaft 120600). This torque may be configured so as to provide adequate force to overcome the friction of the spool valve 3750 in contact with the housing VC3990 and fluid pressure forces in the spool valve assembly. Additionally, a high gear ratio (e.g., 50:1, 40:1, or the like) may be provided that enables the motor, when turned off, to have several wind down revolutions, caused by rotor inertia, without significantly affecting the spool functional position.

In an example embodiment, a VComm state change is initiated in response to receipt of an electronic control signal (e.g., from a conventional two-wire AC power supply). In this example embodiment, the control signal state is initiated by an electrical control signal on/off transition as further described below. The electrical schematic diagram of an example implementation is illustrated in FIGS. 15 through 18.

Figure 15:
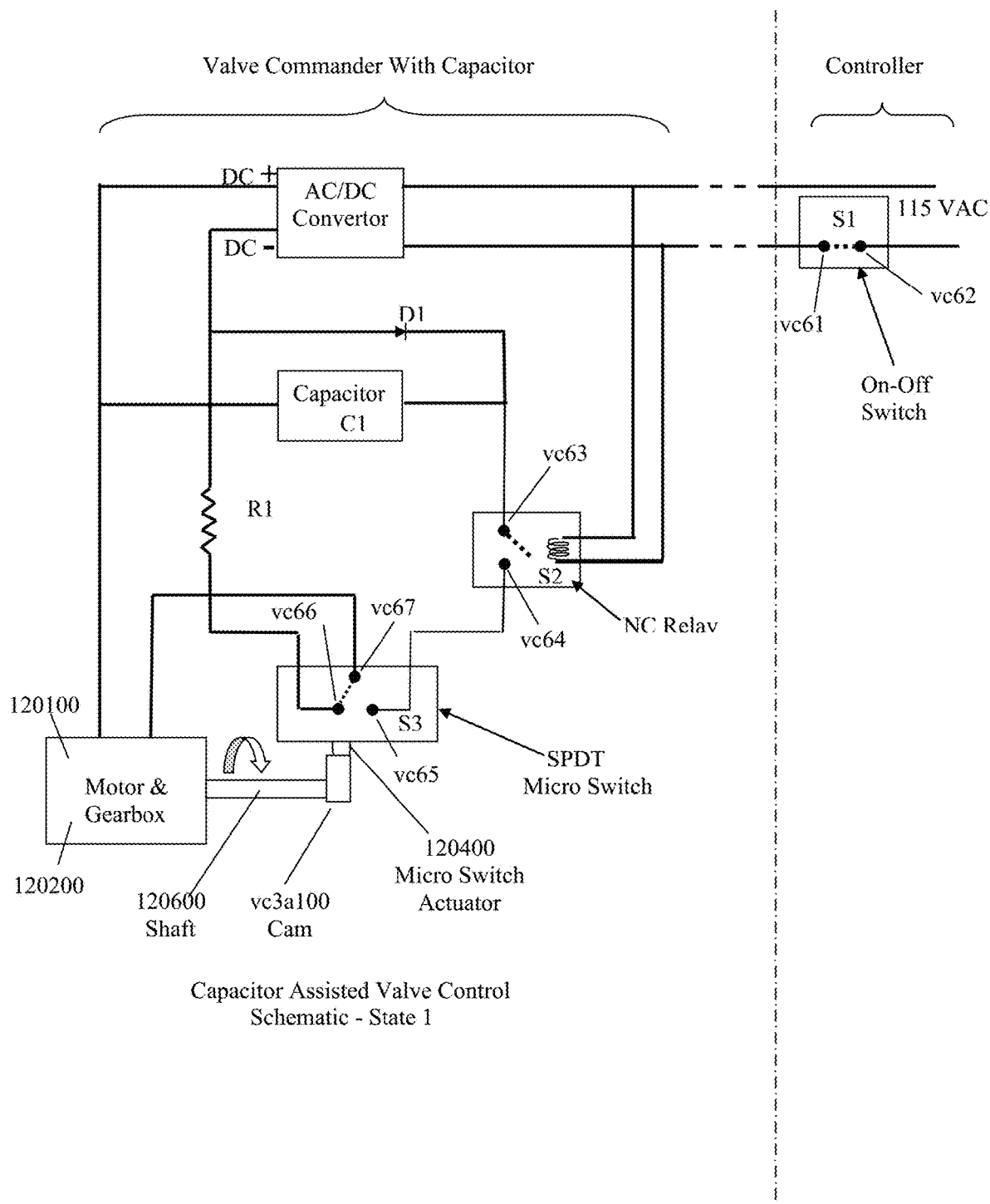
FIG. 15 illustrates a schematic of an example embodiment of a capacitor associated valve control in a first State.

In an example embodiment, in State 1 illustrated in FIG. 15, the external control signal is switched from an off position to an on position at S1. With closure of the circuit vc61-vc62 of switch S1, the AC lines in the schematic of FIG. 15 are energized thus activating the AC/DC converter and causing the opening of the vc63-vc64 circuit/path at the NC (Normally Closed, when no voltage is applied to the relay the contacts are closed) Relay S2. The closed circuits enable a DC circuit comprising: a positive DC circuit leading from the AC/DC converter to motor terminal A and a negative DC circuit leading from the AC/DC converter to motor terminal B via a closed circuit vc66-vc67 of SPDT switch S3. Also during State 1, the capacitor C1 is charging to capacity via the current flow from the AC/DC converter (passing through diode D1), see FIG. 15. The energized DC circuit initiates rotary motion in the electric motor 120100 causing rotational motion in the shaft 120600 and associated crank 120900 of FIG. 11. In this example embodiment, the force of the crank 120900 causes the spool valve VC3750 to shift to the right in FIG. 11.

Figure 16:
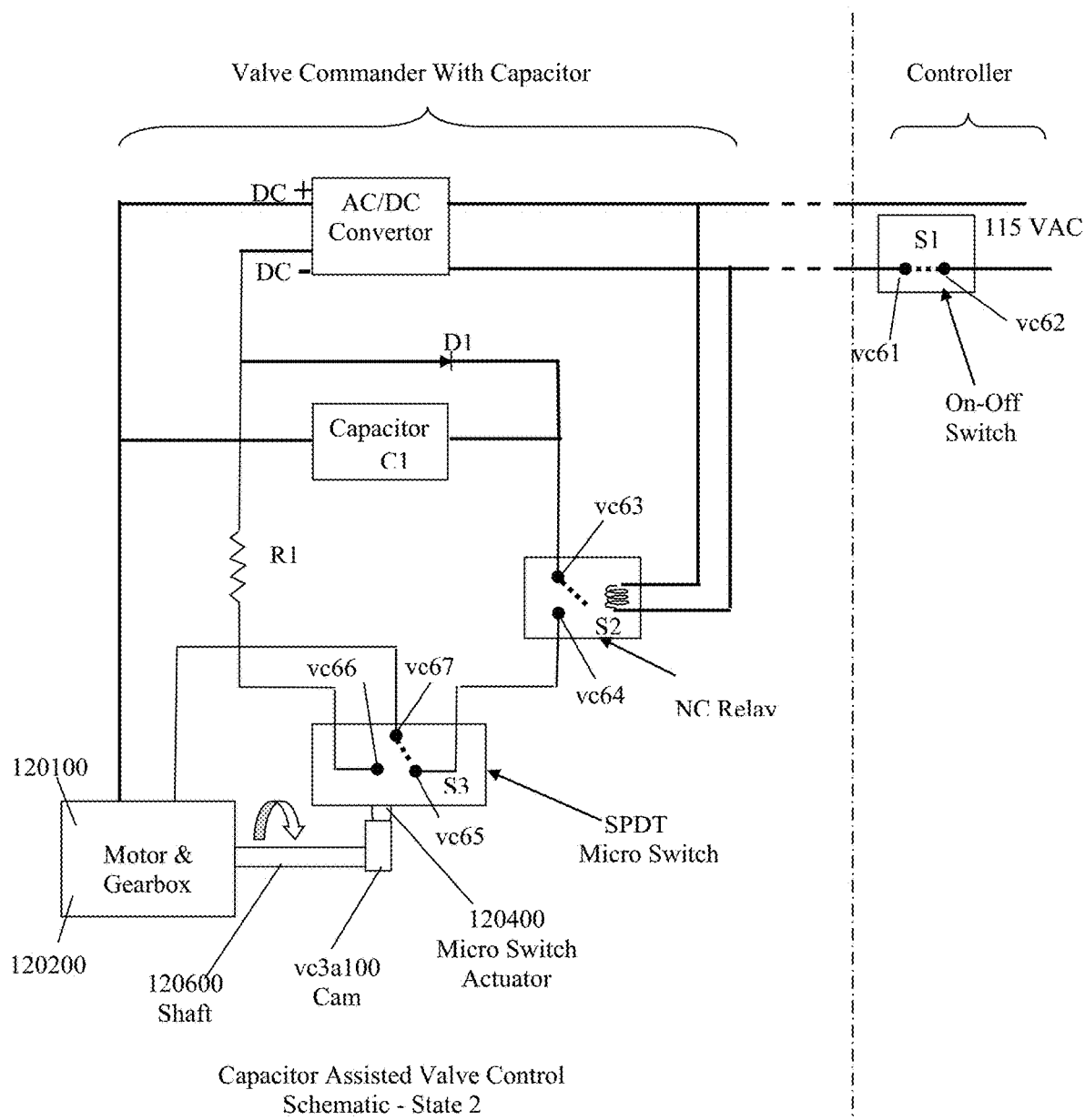
FIG. 16 illustrates a schematic of an example embodiment of a capacitor associated valve control in a second State.

In State 2, illustrated in FIG. 16, when the motor 120100 has turned the cam VC3a100 sufficiently to disengage from the SPDT switch S3, an open circuit/path vc66-vc67 at switch S3 is created which stops current flow through the motor 120100 and there is no motor driven rotation of the shaft 120600 shortly thereafter. In State 2, the shaft 120600, crank 120900, and linked spool VC3750 come to rest in a first position. After charging (generally for a very short period (e.g., 1 to 2 seconds)) the capacitor is fully charged and no current is flowing in the circuit leading from the AC/DC converter through the diode D1. In State 2, the only current drawn thereafter is through the relay S2 coil (in an implementation where an electromechanical relay is used as opposed to a solid state relay) which is at a very low milliamp level. In the first position, the spool VC3750 is positioned in a far downward position as illustrated in FIG. 14 or in a far right position in FIG. 11. The spool VC3750 in the first position enables external fluid to exhaust from the bonnet diaphragm chamber of an associated output valve(s) through fluid port VC3970 and vent/bleed port VC3960 while closing input control fluid port VC3950 as illustrated in FIG. 14. The exhausting of fluid from the diaphragm chamber of the fluidly connected output valve(s) causes, at least in part (e.g., there may be other factors which contribute to the opening of the valve including the upstream fluid pressure through the output valve, etc.), the output valve(s) to open (an "on" state). In this example embodiment, the shaft first position is offset by approximately 180 degrees, plus or minus a few degrees (e.g., 1, 2, 3, 4, 5 degrees, etc.) from an initial start position in State 1. In State 2, when the switch S3 circuit/path vc67-vc66 opens, the circuit/path vc67-vc65 of switch S3 closes.

Figure 17:
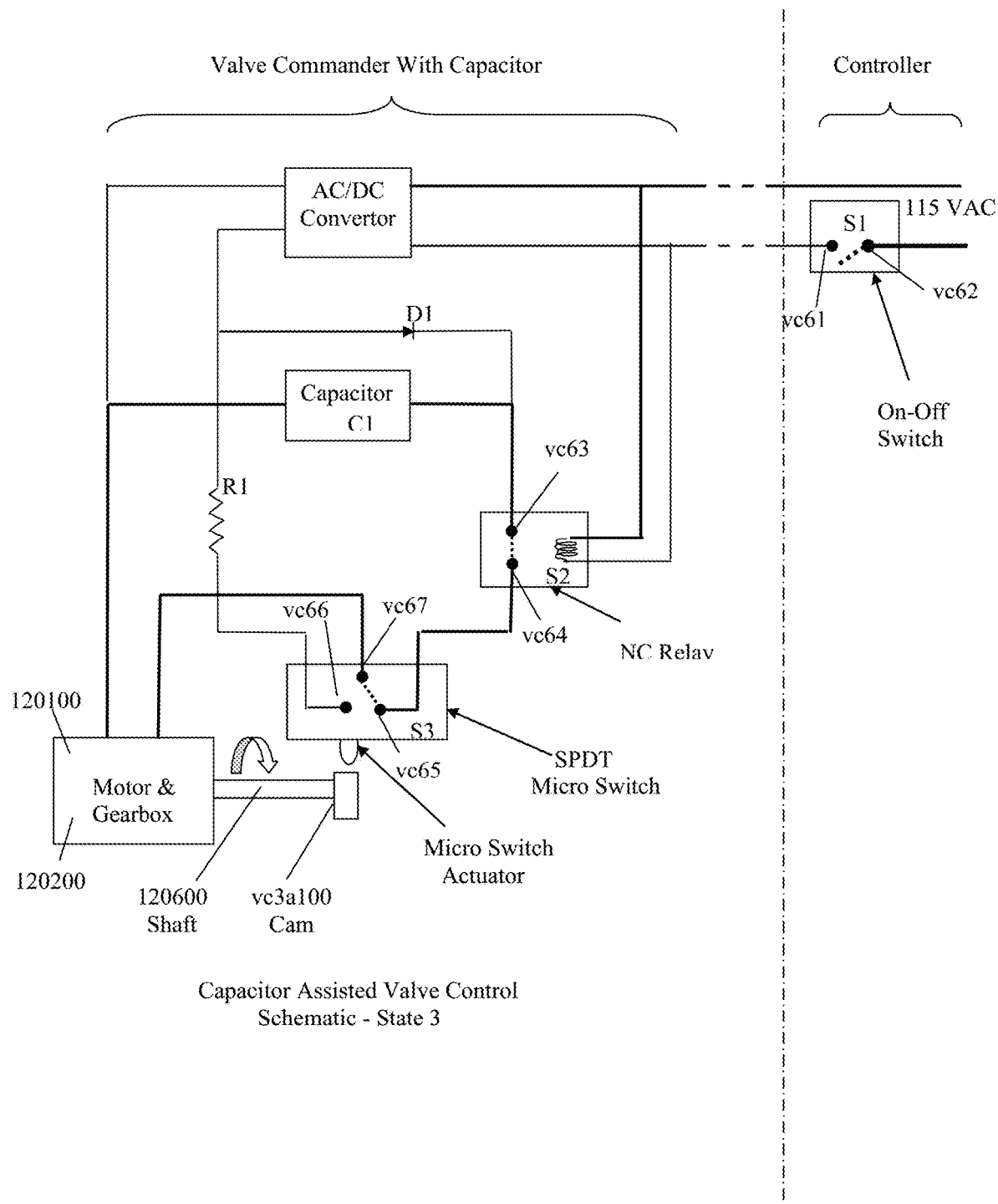
FIG. 17 illustrates a schematic of an example embodiment of a capacitor associated valve control in a third State.

In State 3, illustrated in FIG. 17, the external control signal is switched from an on position to an off position at S1. With the opening of the circuit path vc61-vc62 of switch S1, the AC lines (illustrated in the schematic) are no longer energized and there is no DC current flowing through the AC/DC converter. When the circuit path vc61-vc62 of switch S1 is open there is also no AC current flow through the coil of relay S2, thus enabling the closure of the circuit path vc63-vc64 of relay S2. With the relay S2 closure, the capacitor C1 initiates a discharge through the closed relay S2 (circuit patch vc63-vc64) and the switch S3 closed circuit vc65-vc67 to a terminal B of motor 120100. Terminal A of motor 120100 is connected to the AC/DC Convertor as illustrated in FIG. 17. The energized (by way of capacitor C1) circuit initiates rotary motion in the electric motor causing the shaft 120600 and associated crank 120900 to rotate. In this example embodiment, the force of the crank 120900 causes the spool valve VC3750 to shift to the left in FIG. 11.

Figure 18:
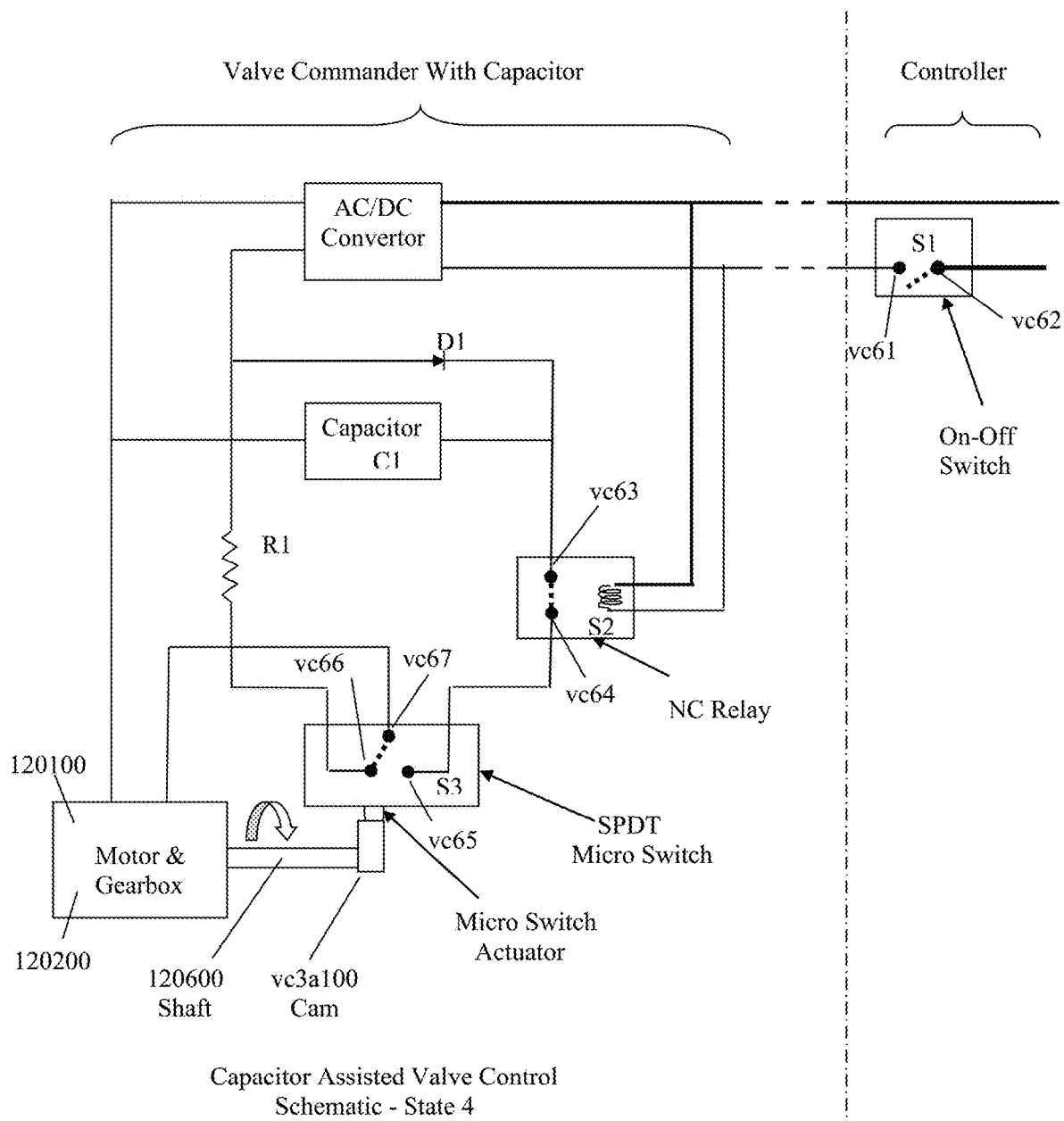
FIG. 18 illustrates a schematic of an example embodiment of a capacitor associated valve control in a fourth State.

In State 4, illustrated in FIG. 18, as the shaft 120600 continues to rotate the cam VC3a100 engages the interfacing SPDT switch S3 causing the capacitor C1 energized circuit to open via an opening of the vc67-vc65 circuit/path. In State 4, the switch S3 also closes the vc66-vc67 circuit/path to position the circuit for State 1 operation. In State 4, the open circuit causes the running electric motor and connected shaft 120600 to stop in a second position a short period thereafter. In the second position, the crank action of State 3 and State 4 causes the spool 120700 to be positioned to the far left as illustrated in FIG. 11 and at the top in FIG. 13. As further illustrated in the electrical schematic of FIG. 18, there is no current flowing in either the AC or the DC circuits. The VComm assembly stays at rest until the AC power is turned on in State 1. The spool VC3750 in the second position enables external control fluid to enter fluid port VC3950, pass through the fluid management subsystem, and exit an open fluid port VC3970 while blocking fluid port VC4960 as illustrated in FIG. 13. The control fluid exiting the fluid port VC3970 enters an associated output valve(s) (e.g. via an external fluid passage such as a tube to a bonnet chamber) to cause, at least in part, the output valve(s) to close (an "off" state). In this example embodiment, the shaft second position is offset by approximately 180 degrees, plus or minus a few degrees (e.g., 1, 2, 3, 4, 5 degrees, etc.) from the first position in State 2.

The amp hour storage in the capacitor C1 is configured to be sufficient to energize the electric motor through at least a normal half turn (e.g., 180 degrees) of the cam and spool valve crank. To accomplish this the capacitor C1 is continually charged to full storage capacity during the power on segment of VComm operation including when the circuit vc66-vc67 powering the motor is broken by the cam operating switch S3. The capacitor C1 is configured to have adequate storage to provide sufficient power to the motor to complete the required rotations needed for complete resetting of the spool valve VC3750 (e.g., movement of the spool valve to the second position). A given capacitor will charge to capacity at a low voltage to provide a certain amount of power (watts) on discharge. The same capacitor can be charged at a higher voltage to provide more total power. Thus, if more power is needed to operate a VComm unit, higher voltages can be applied to provide additional wattage seconds of power. Since the operating time associated with a state change is very short (e.g., 1 or 2 seconds), no motor overheating results from higher current flowing through the motor windings. However, if the normal voltage directly from the AC/DC converter is too high for the motor, a resistor R1 or other voltage reduction device can be placed in the circuit to drop the voltage to an acceptable level. (Note: R1 is not in the capacitor discharge path.) Optionally, the resistor R1 is a variable resistor which is user configurable via an external control (such as a dial with one or more displayed resistance settings). Optionally, there may be multiple versions of a VComm unit, such as a version without a resistor and a version with a resistor or variable resistor.

Figure 19:
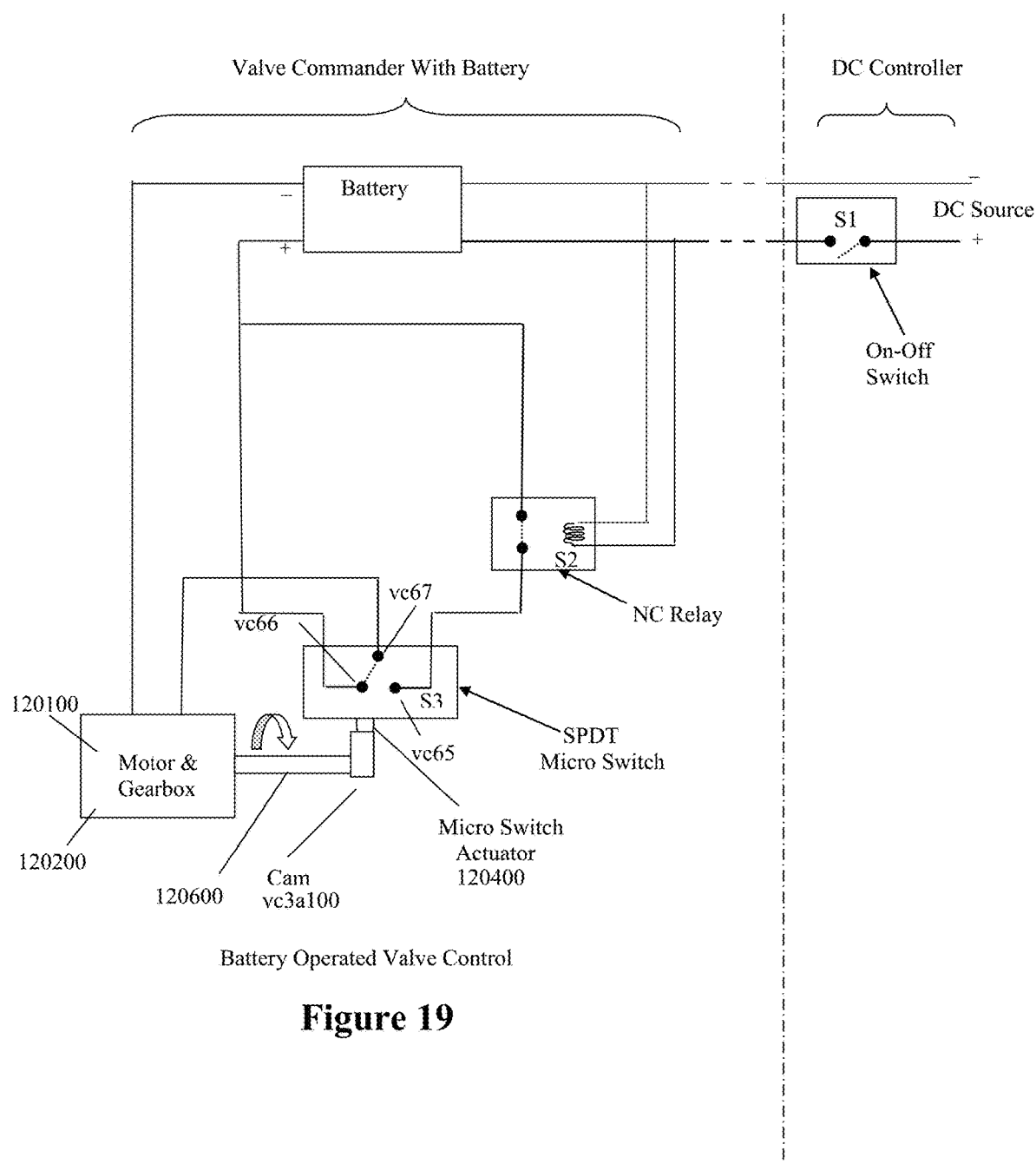
FIG. 19 illustrates a schematic of an example embodiment of a battery associated valve control wherein the controller is a DC on/off power supply.

Optionally, the AC/DC convertor in FIGS. 15-18 can be replaced with a battery, and the coil in Relay S1 can be a DC relay as illustrated in FIG. 19. The states are similar to those described above with respect to FIGS. 15-18, but with the DC battery providing the current used to drive the motor. Thus, advantageously, this technique enables control by an even larger range of conventional irrigation industry controllers, while also minimizing or reducing any installation and user interface changes.

In the example embodiment of a capacitor-enabled VComm unit, the VComm unit can be configured to operate in a manner different from the states described above. For example, in an example embodiment, turning on S1 may cause one or more associated output valves to turn off rather than turn on.

Certain fluid systems, such as a BOOMBACK center pivot irrigation system or other fluid system including systems requiring a 4 port solenoid, may conventionally require separate control of multiple sets of output valves (e.g., wherein a set of output valves comprises a single output valve or a plurality of output valves) typically requiring a plurality of solenoids as described above. In contrast to such conventional systems, optionally, a VComm unit disclosed herein may be configured and utilized to efficiently and cost effectively control valves and irrigation areas. In an example embodiment of a capacitor-enabled VComm unit (as described for example in FIGS. 15-18), the fluid management element may be configured with a 4 port spool/housing arrangement similar to that described above with respect to FIGS. 7 and 8. Linear movement of the spool to the far left (see FIG. 7) enables, for example, the spool grooves (and fluid element housing and O-rings) to create a first fluid passage whereby upstream control fluid traverses a first fluid passage and enters, for example via a fluid connection from output port 142300, a second set of output valves causing, at least in part, the second set of output valves to close (e.g., via fluid entering the bonnet diaphragm chamber causing the associated valves to close). Also, when the spool is to the far left, fluid is vented (e.g., to ambient) from the first set of output valves through a second fluid passage causing, at least in part, the first set of output valves to open (e.g., via fluid exiting the bonnet diaphragm chamber causing the valves to open). Linear movement of the spool to the far right (see FIG. 8) enables, for example, the spool grooves (and fluid element housing and O-rings) to create a third fluid passage enabling upstream control fluid to be directed into a first set of output valves causing, at least in part, the first set of output valves to close (e.g., via fluid entering the bonnet diaphragm chambers causing the valves to close). Also, when the spool is to the far right, fluid is vented (e.g., to ambient) from the second set of output valves through a fourth fluid passage through the fluid element causing, at least in part, the second set of output valves to open (e.g., via fluid exiting the bonnet diaphragm chamber causing the valve to open). Optionally, a fluid pressure booster described below may also be configured into the fluid element to assist in spool movement.

Pressure Booster

If stored capacitor energy is insufficient to drive the motor properly, a fluid pressure boost may be applied to the spool valve in the external port VC3970 shown in FIG. 11. Upstream fluid (for example, fluid entering the input side of an output valve to be controlled by the VComm unit) is connected to the pressure port VC3970 which creates additive force to push the spool to the left (provided the VComm assembly is configured such that the stored capacitor C1 energy is used to move the spool to the left) in FIG. 11 (and upwards in FIG. 13). Advantageously, with a configured pressure booster port, the electric motor need only move the crank 120900 (via the shaft 120600) enough such that the fluid pressure has enough leverage to complete a crank half rotation (i.e., 180 degrees). Thus, for example, a capacitor enabled motor driven rotation of the crank a portion of the 180 degrees (for example, 10 degrees, 15, degrees, etc.) is sufficient for VComm state change operation. If a pressure booster is used, the upstream fluid force acting on the spool needs to be overcome by the normal motor power when changing to the other state (e.g., State 2 in the example above). Adjusting voltages of the AC/DC convertor or the values of R1 can be used to offset the fluid pressure of the pressure booster.

Thus, an example embodiment of a VComm assembly configured with a capacitor as described above, advantageously, enables the on/off control of one or more fluidly connected output valves via a two-wire, on/off AC switch controller.

Reverse Polarity Controller Embodiment I

Some irrigation controllers use reverse polarity of a power supply to effect a change in solenoid valve fluid flow state. A variation of this is the use of a capacitor to drive a latching solenoid, as in the case of the NELSON IRRIGATION TWIG wireless controller. For clarity, although the TWIG controller includes a capacitor, the capacitor utilized in the TWIG controller does not perform the same function as the VComm Capacitor C1 described previously with respect to FIGS. 15-18. The TWIG controller uses two D Cell batteries to provide 3 volts to power the system. The TWIG controller uses D Cell batteries to operate its radio control functions, its computerized functions, and to operate solenoid valves. Generally, the 3 volts provided by the D Cell batteries is insufficient voltage to perform all of the operational tasks required. To solve this problem the TWIG controller has a DC to AC converter and a transformer to increase the voltage which is then converted back to DC and is stored in a capacitor for times when current higher than the convertor can provide is needed, such as during solenoid operation.

A VComm unit can be provisioned with an electric circuit to accommodate polarity reversing of supplied power. The VComm motor 120100, crank 120900, switch S3, and spool valve mechanical linkages 120800 may be utilized as in other example embodiments previously described. The different electric circuit is illustrated in FIGS. 20-23 and a special case electric circuit is further illustrated in FIGS. 24-27. Advantageously, in these example embodiments no battery power is consumed when the VComm motor is inactive. This greatly extends battery life and reduces associated maintenance costs.

FIGS. 20-23 illustrate an example embodiment of the circuitry used to accommodate a capacitor driven controllers such as the TWIG controller. In some cases it may be desirable to conserve the energy in the TWIG controller capacitor and only use a small portion of its energy for signaling purposes and not as a power source. Therefore, the voltage used to operate the motor 120100 is drawn directly from the existing batteries in the TWIG controller and the reversing capacitor discharge is used to trigger a state change. This arrangement also applies to other industry controllers that use capacitors to actuate solenoids.

Figure 20:
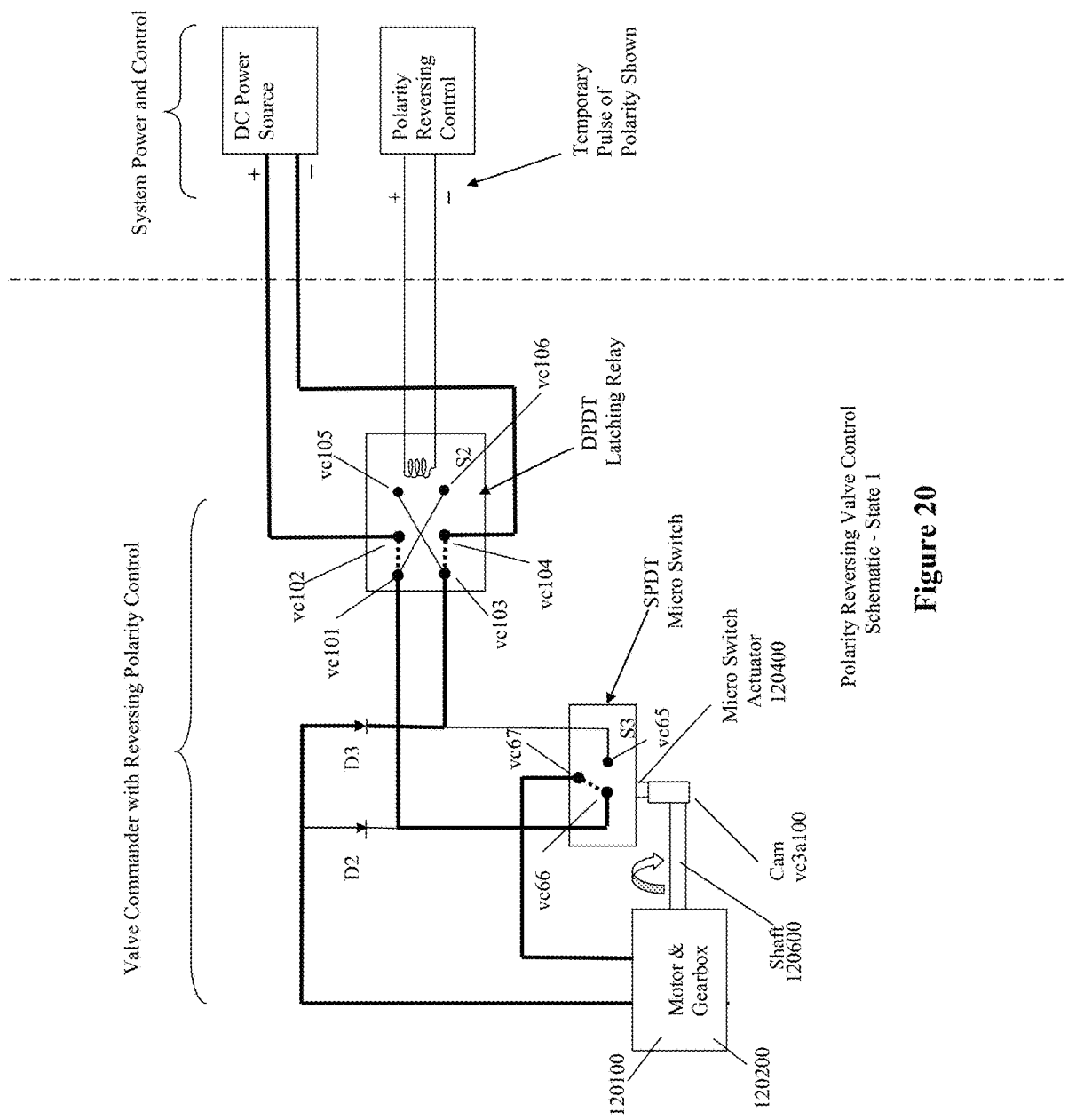
FIG. 20 illustrates a schematic of an example embodiment of a valve control signaled via a polarity reversing control in a first State.

The schematic drawing in FIG. 20 illustrates the circuitry used for an example embodiment VComm unit operationally controlled by a TWIG-type controller. DC power is provided to the electronic circuit by batteries located in the controller and state change is provided by polarity reversing signals from a separate element of the controller.

In an example embodiment, in State 1 illustrated in FIG. 20, a polarity pulse controls a latching DPDT relay S2 that creates an energized DC circuit via the micro-switch S3 and diode D3 to power the motor 120100 as described further herein. The receipt of the reverse polarity signal causes the circuit/path vc101-vc102 and vc103-vc104 to close within the DPDT latching relay switch S2. The closed circuits enable a positive DC current path via latching relay S2 (vc102-vc101) and micro-switch S3 (vc111-vc110) to motor terminal B and a negative DC current path from motor terminal A via diode D3 and latching relay S2 (vc103-vc104). The energized DC circuit initiates rotary motion in the electric motor causing rotation of the shaft 120600 and associated crank 120900 of FIG. 11. In this example embodiment, the force of the crank 120900 causes the spool valve to shift to the right in FIG. 11 (or downward with respect to FIG. 14).

Figure 21:
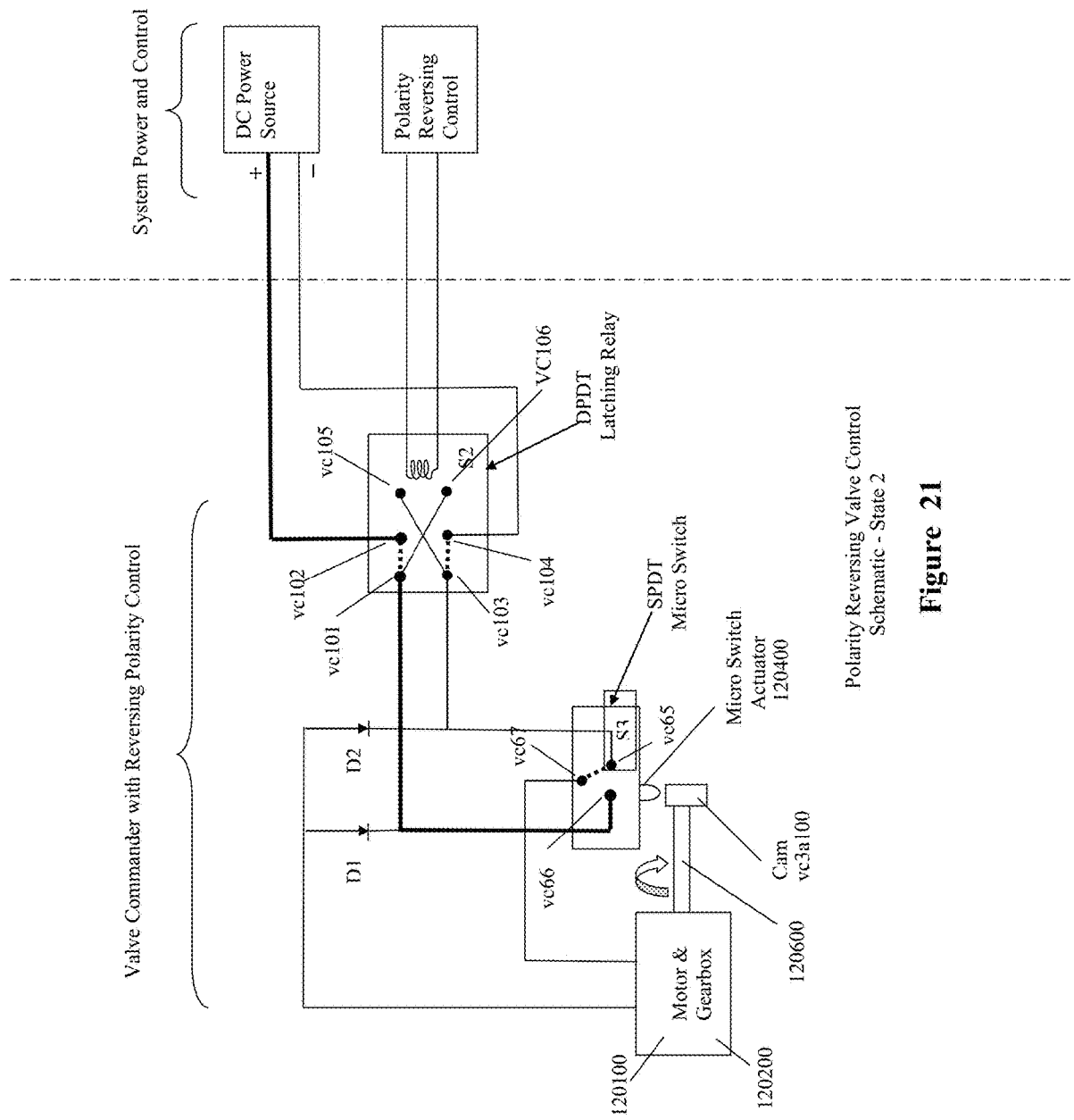
FIG. 21 illustrates a schematic of an example embodiment of a valve control signaled via a polarity reversing control in a second State.

In State 2, illustrated in FIG. 21, when the motor has turned the cam VC3a100 sufficiently to disengage from the switch S3, an open circuit/path vc111-vc110 at switch S3 is created which stops the motor 120100, and there is no motor driven rotation of the shaft 120600 shortly thereafter. In State 2, the shaft 120600, crank 120900, and linked spool 120700 come to rest in a first position. In State 2, there is no DC current flowing once the switch S3 is opened. In the first position, the crank causes the spool VC3750 to be positioned to the far downward position as illustrated in FIG. 14 or to the far right in FIG. 11. The spool VC3750 in the first position enables external fluid to exhaust from the bonnet diaphragm chamber of the associated output valve(s) through fluid port VC3970 and vent/bleed port VC3960 while closing input control fluid port VC3950 as illustrated in FIG. 14. The exhausting of fluid from the diaphragm chamber of the fluidly connected output valve(s) causes, at least in part (as there may be other factors which contribute to the opening of the valve including, for example, the upstream fluid pressure through the output valve, etc.), the output valve(s) to open (an "on" state). In this example embodiment, the shaft first position is offset by approximately 180 degrees, plus or minus a few degrees (e.g., 1, 2, 3, 4, 5 degrees etc.) from an initial start position in State 1. Lastly, in State 2, when the micro-switch S3 circuit/path vc110-vc111 opens, the circuit/path vc110-vc113 of switch S3 closes.

Figure 22:
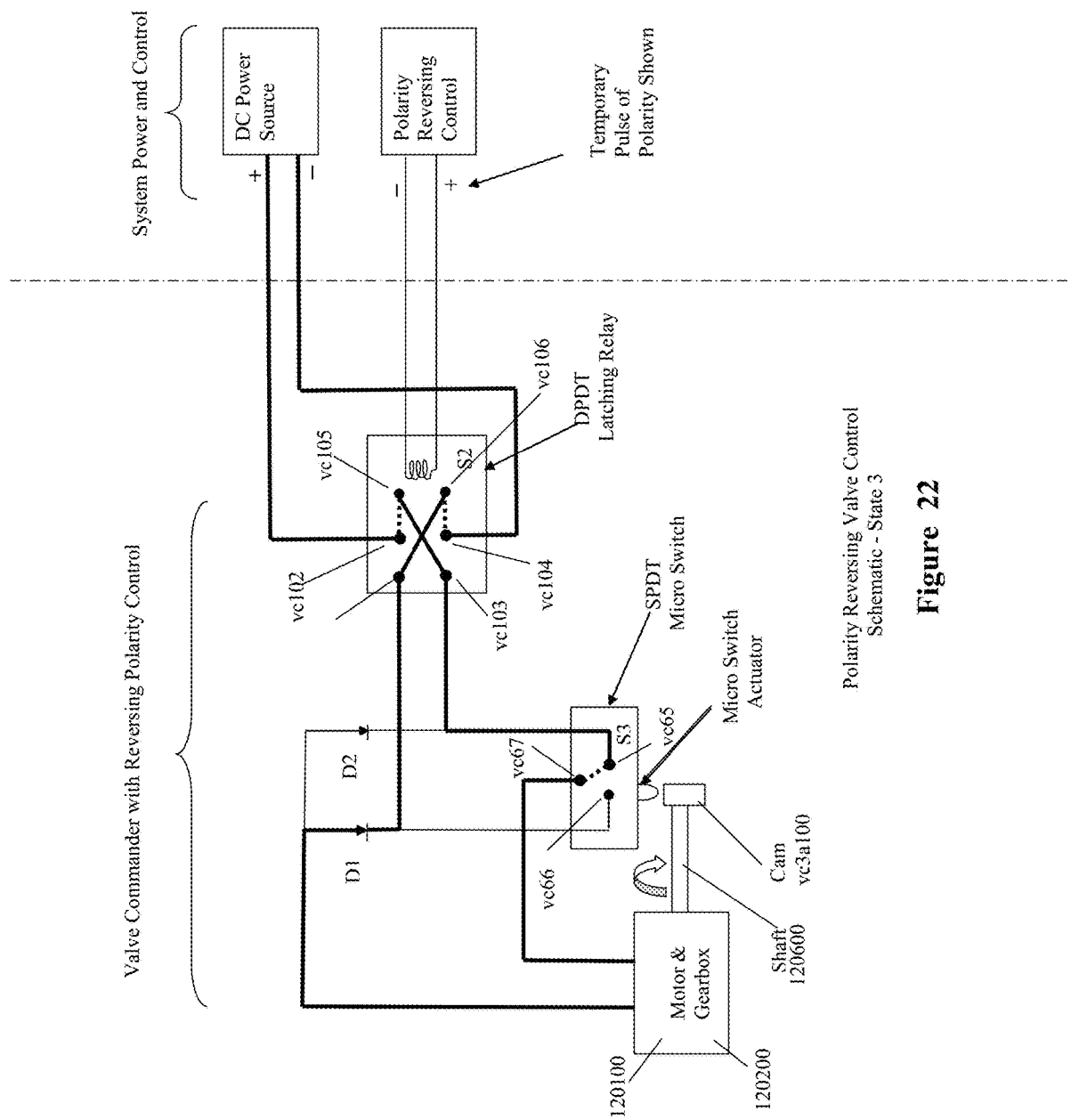
FIG. 22 illustrates a schematic of an example embodiment of a valve control signaled via a polarity reversing control in a third State.

In State 3, illustrated in FIG. 22, the DC polarity is reversed from State 1 via the polarity reversing controller. The polarity reversal signal received at the latching DPDT relay S2 causes a change to the S2 internal connections to enable continuity of the DC circuit through the diode D2 and switch S3 as further described herein. The receipt of the reverse polarity signal causes the closure of the circuit path vc104-vc106 and vc102-vc105 within the DPDT latching relay switch S2. The closed circuits enable a positive DC current path via latching relay S2 (vc102-vc105) and micro-switch S3 (vc113-vc110) to motor terminal B and a negative DC current path from motor terminal A via diode D2 and latching relay S2 (vc106-vc104). The energized DC circuit initiates rotary motion in the electric motor causing the shaft 120600 and associated crank 120900 to rotate. In this example embodiment, the force of the crank 120900 causes the spool valve to shift to the left as illustrated in FIG. 11 (or upward with respect to FIG. 14).

Figure 23:
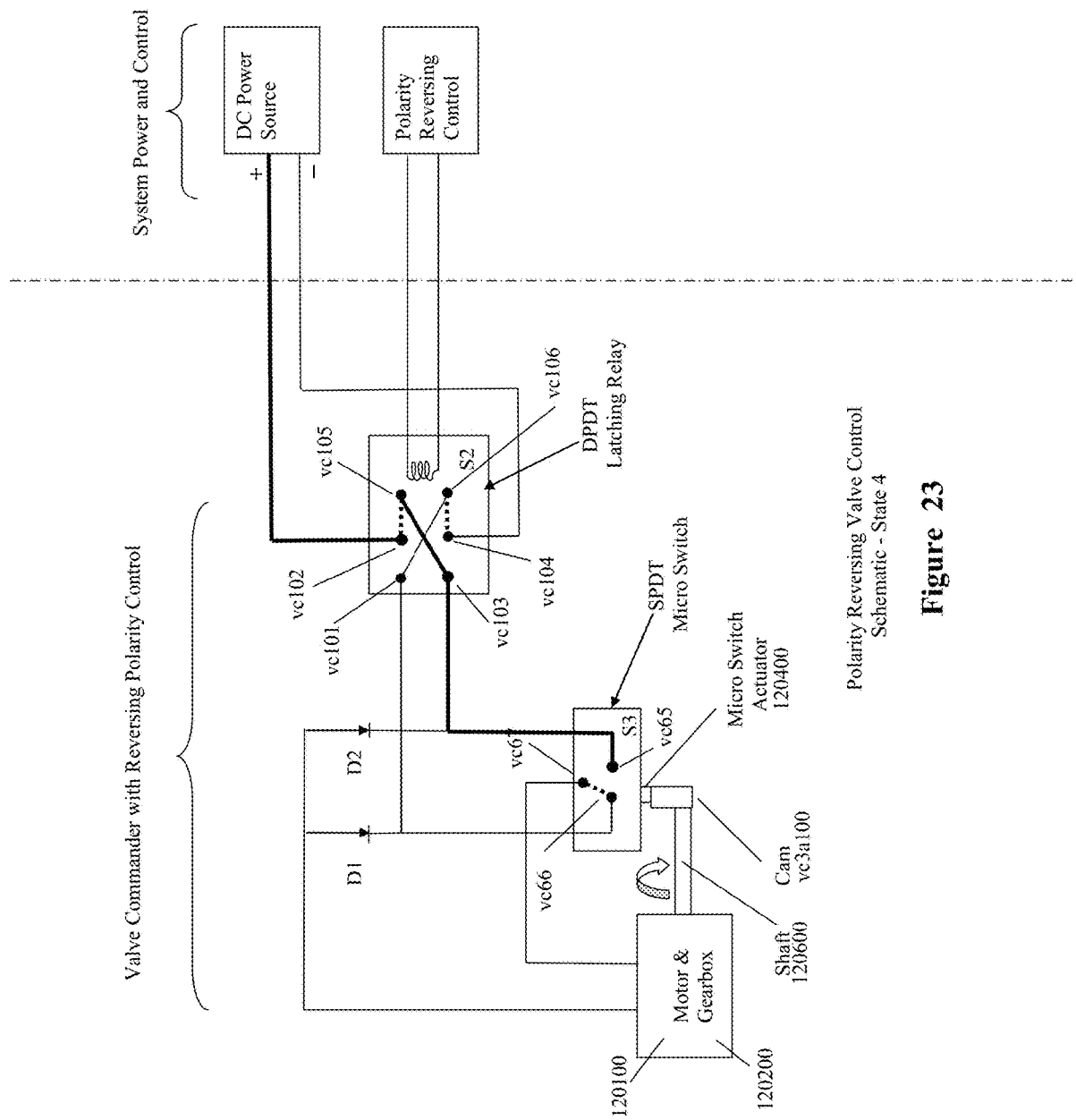
FIG. 23 illustrates a schematic of an example embodiment of a valve control signaled via a polarity reversing control in a fourth State.

In State 4, illustrated in FIG. 23, as the shaft 120600 rotates the cam engages the interfacing SPDT micro-switch S3 causing an opening of the vc113-vc110 circuit/path at switch S3 which stops current flow through the motor 120100 and there is no motor driven rotation of the shaft 120600 shortly thereafter. In State 4, the switch S3 also closes the vc110-vc111 circuit/path to position the circuit for State 1 operation. In State 4, the connected shaft 120600 and spool 120700 come to rest in a second position. In the second position, the crank action of State 3 and State 4 causes, at least in part (as there may be other factors which contribute to the opening of the valve including, for example, the upstream fluid pressure through the output valve, etc.), the spool VC3750 to be positioned to the far left as illustrated in FIG. 11. As further illustrated in the electrical schematic of FIG. 23, there is no current flowing in the DC circuits. The VComm assembly stays at rest until a subsequent DC polarity reversal signal is received in State 1. The spool VC3750 in the second position enables external control fluid to enter fluid port VC3950, pass through the fluid management subsystem, and exit an open fluid port VC3970 while blocking fluid port VC3960 as illustrated in FIG. 13. The control fluid exiting the fluid port VC3970 enters an associated output valve(s) (e.g., via an external fluid passage, such as a tube to a bonnet chamber) to cause, at least in part, the output valve(s) to close (an "off" state). In this example embodiment, the shaft second position is offset by approximately 180 degrees, plus or minus a few degrees (e.g., 1, 2, 3, 4, 5 degrees, etc.) from the first position in State 2.

In the example embodiment just described (FIGS. 20-23), the latching relay S2 in these diagrams is located in the VComm unit which utilizes four interconnecting wires. An alternate embodiment can have the latching relay configured within or near the controller assembly, and may thus utilize only a 2 wire interconnection across a distance between the VComm unit and Controller. In this example, the functional schematic is the same, only the relay location is different. The location preference can be determined by the user at the time of installation.

Certain fluid systems, such as a BOOMBACK center pivot irrigation system or other fluid system including systems requiring a 4 port solenoid, may conventionally require separate control of multiple sets of output valves (e.g., wherein a set of output valves comprises a single output valve or a plurality of output valves) typically requiring a plurality of solenoids as described above. In contrast to such conventional systems, optionally, a VComm unit disclosed herein may be configured and utilized to efficiently and cost effectively control valves and irrigation areas. In an example embodiment of a Reverse Polarity I VComm unit (as described for example in FIGS. 15-18), the fluid management element may be configured with a 4 port spool/housing arrangement similar to that described above with respect to FIGS. 7 and 8. Linear movement of the spool to the far left (see FIG. 7) enables, for example, the spool grooves (and fluid element housing and O-rings) to create a first fluid passage whereby upstream control fluid traverses a first fluid passage and enters, for example via a fluid connection from output port 142300, a second set of output valves causing, at least in part, the second set of output valves to close (e.g., via fluid entering the bonnet diaphragm chamber causing the associated valves to close). Also, when the spool is to the far left, fluid is vented (e.g., to ambient) from the first set of output valves through a second fluid passage causing, at least in part, the first set of output valves to open (e.g., via fluid exiting the bonnet diaphragm chamber causing the valves to open). Linear movement of the spool to the far right (see FIG. 8) enables, for example, the spool grooves (and fluid element housing and O-rings) to create a third fluid passage enabling upstream control fluid to be directed into a first set of output valves causing, at least in part, the first set of output valves to close (e.g., via fluid entering the bonnet diaphragm chambers causing the valves to close). Also, when the spool is to the far right, fluid is vented (e.g., to ambient) from the second set of output valves through a fourth fluid passage through the fluid element causing, at least in part, the second set of output valves to open (e.g., via fluid exiting the bonnet diaphragm chamber causing the valve to open). Optionally, a fluid pressure booster described below may also be configured into the fluid element to assist in spool movement.

Thus, an example embodiment of a VComm assembly configured as described above, advantageously, can be operationally controlled by a TWIG-type controller wherein DC power is provided to the electronic circuit by batteries located in the controller and state change is provided by polarity reversing signals from the controller.

Reverse Polarity Controller Embodiment II

FIGS. 24-27 illustrate a schematic in which an example embodiment of a VComm unit is controlled via a DC power polarity reversing controller. Advantageously, in this example embodiment, the polarity reversing circuit enables the following features: the motor rotates in the same direction at each cycle for simplicity, consistent with the VComm devices previously described above; only two interconnecting wires are needed to provide control and power to the VComm unit thereby reducing installation costs and simplifying installation; and, DC power is consumed only during a state changing operation, extending the life of the power source resulting in reducing capital and maintenance costs.

Figure 24:
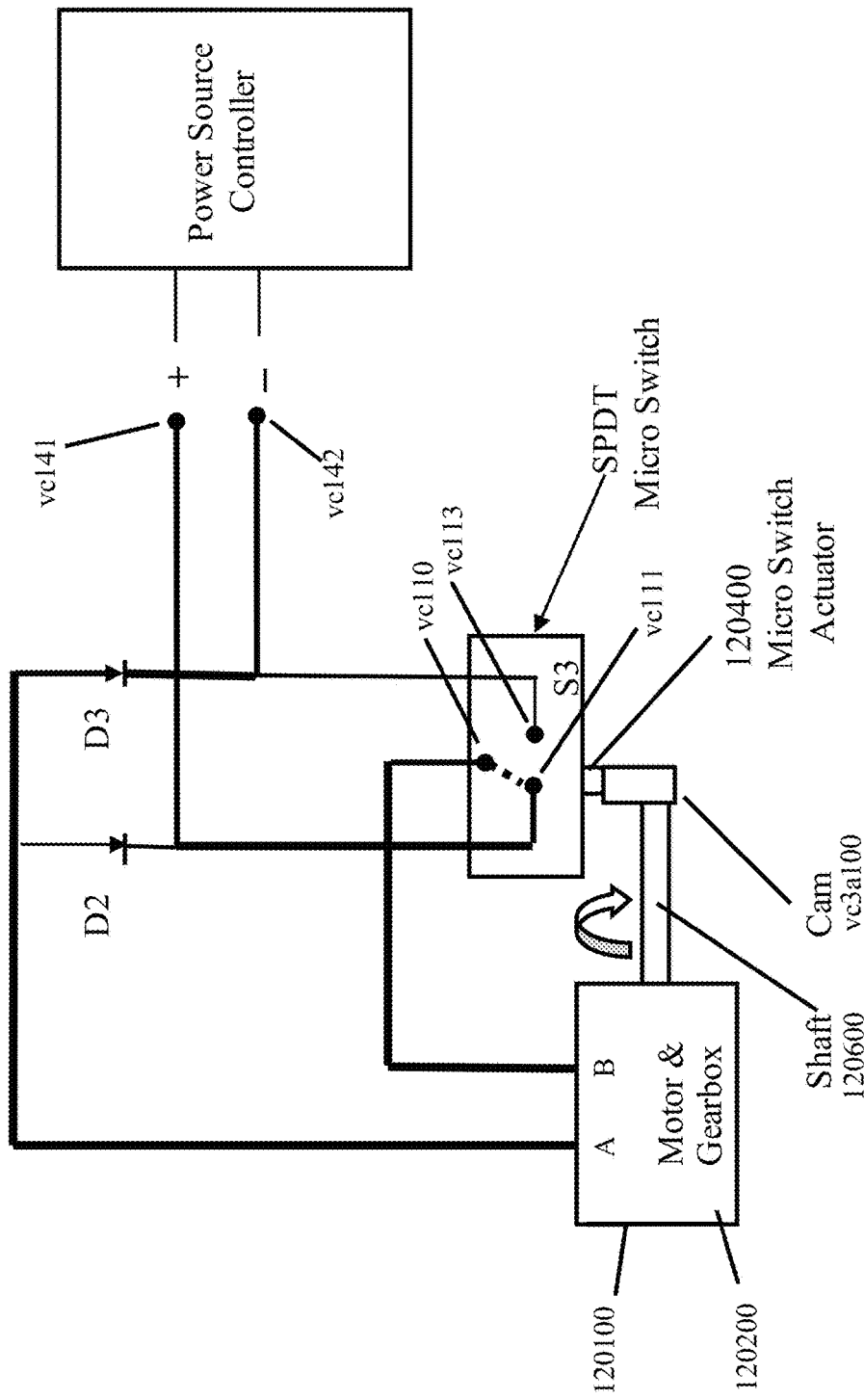
FIG. 24 illustrates a schematic of an example embodiment of a valve control signaled via a polarity reversing control from a DC power source in a first State.

In an example embodiment, in State 1 illustrated in FIG. 24, a polarity of a DC supply voltage is shown. Receipt of a reverse polarity signal from the DC power supply (e.g., a transition to a +DC at terminal vc141 and a −DC at terminal vc142) energizes a positive DC circuit comprising the closed circuit/path vc111-vc110 of SPDT switch S3 to motor terminal B and a negative DC current path from motor terminal A via diode D3. The energized DC circuit initiates rotary motion in the electric motor causing rotation of the shaft 120600 and associated crank 120900 of FIG. 11. In this example embodiment, the force of the crank 120900 causes the spool valve to shift to the right in FIG. 11 (or downward with respect to FIG. 14).

Figure 25:
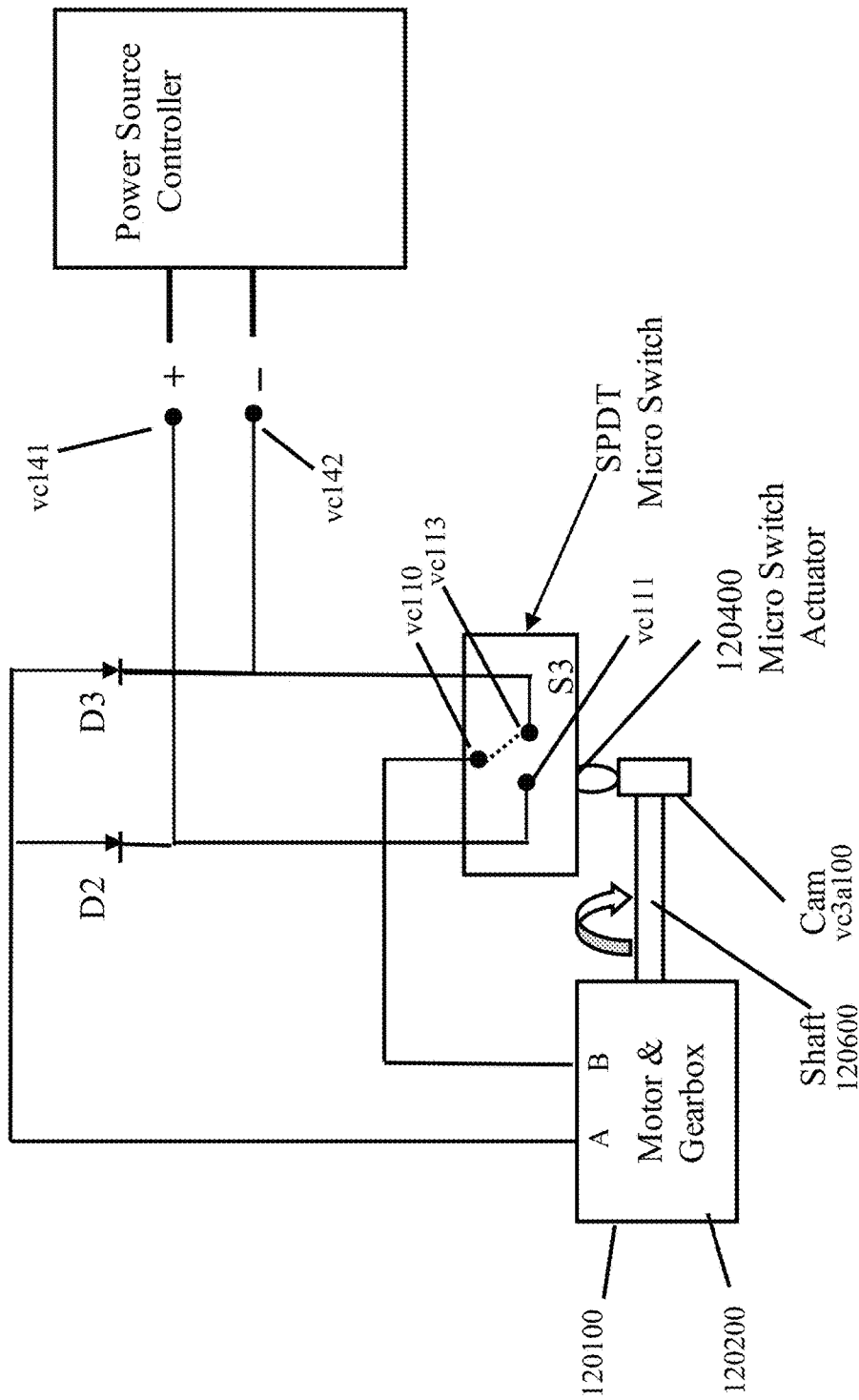
FIG. 25 illustrates a schematic of an example embodiment of a valve control signaled via a polarity reversing control from a DC power source in a second State.

In State 2, illustrated in FIG. 25, when the motor has turned the cam VC3*a*100 sufficiently to disengage from the switch S3, an open circuit/path vc111-vc110 of SPDT switch S3 is created which stops the motor 120100 and there is no motor driven rotation of the shaft 120600 shortly thereafter. In State 2, the shaft 120600, crank 120900, and linked spool 120700 come to rest in a first position. In State 2, there is no DC current flowing once the vc111-vc110 circuit/path of SPDT switch S3 is opened. In the first position, the crank causes the spool VC3750 to be positioned to the far downward position as illustrated in FIG. 14 or to the far right in FIG. 11. The spool VC3750 in the first position enables external fluid to exhaust from the diaphragm chamber of the associated output valve(s) through fluid port VC3970 and vent/bleed port VC3960 while closing input control fluid port VC3950 as illustrated in FIG. 14. The exhausting of fluid from the diaphragm chamber of the fluidly connected output valve(s) causes, at least in part (as there may be other factors which contribute to the opening of the valve including, for example, the upstream fluid pressure through the output valve, etc.), the output valve(s) to open (an "on" state). In this example embodiment, the shaft first position is offset by approximately 180 degrees, plus or minus a few degrees (e.g., 1, 2, 3, 4, 5 degrees etc.) from an initial start position in State 1. While the cam VC3*a*100 caused the open circuit/path vc110-vc111 of switch S3 in this State 2, it also caused the closure of the circuit/path vc110-vc113 of switch S3.

Figure 26:
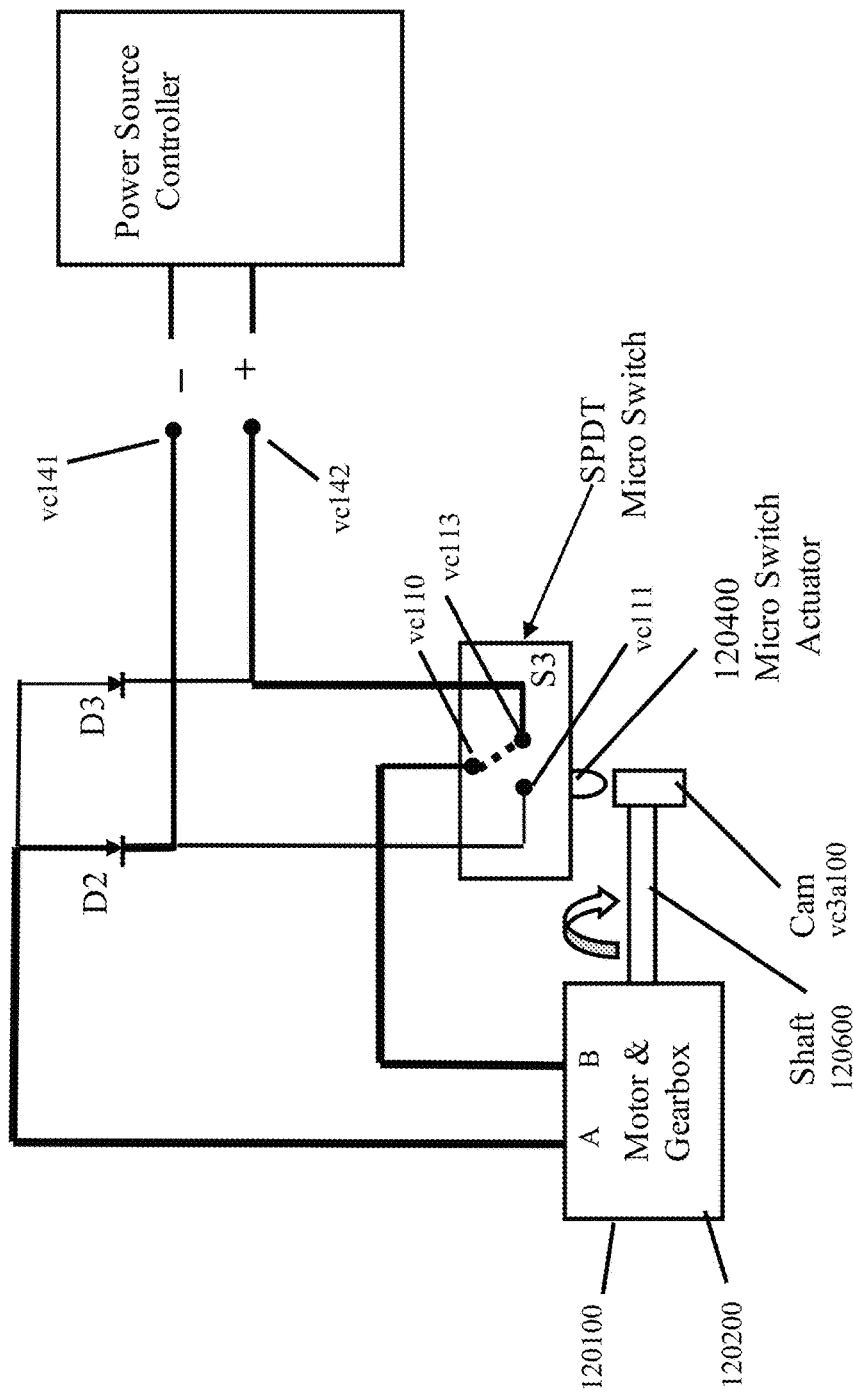
FIG. 26 illustrates a schematic of an example embodiment of a valve control signaled via a polarity reversing control from a DC power source in a third State.

In State 3, illustrated in FIG. 26, the DC power supply polarity is reversed from State 1. Receipt of a reverse polarity signal from the DC power supply (e.g., a transition to a −DC at terminal vc141 and a +DC at terminal vc142) energizes a positive DC circuit comprising the closed circuit/path vc113-vc110 of SPDT micro-switch S3 to motor terminal B and a negative DC current path from motor terminal A via diode D2. The energized DC circuit initiates rotary motion in the electric motor causing rotation of the shaft 120600 and associated crank 120900 of FIG. 11. In this example embodiment, the force of the crank 120900 causes the spool valve to shift to the left in FIG. 11 (or upward with respect to FIG. 14).

Figure 27:
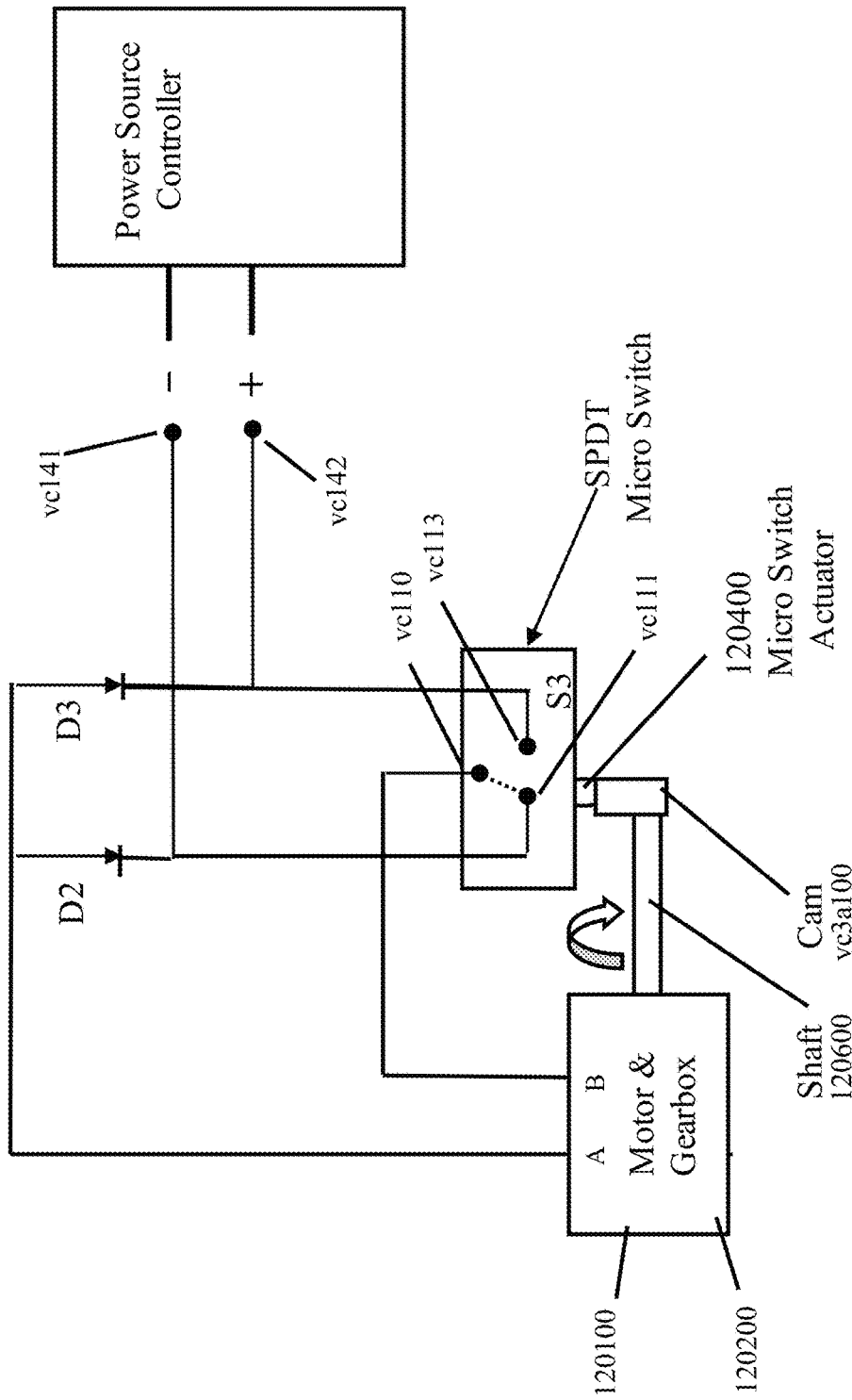
FIG. 27 illustrates a schematic of an example embodiment of a valve control signaled via a polarity reversing control from a DC power source in a fourth State.

In State 4, illustrated in FIG. 27, as the shaft 120600 rotates the cam engages the interfacing SPDT micro-switch S3 causing an opening of the vc113-vc110 circuit/path of SPDT switch S3 which stops current flow through the motor 120100 and there is no motor driven rotation of the shaft 120600 shortly thereafter. In State 4, the switch S3 also closes the vc111-vc110 circuit/path to position the circuit for State 1 operation. In State 4, the connected shaft 120600 and spool VC3750 come to rest in a second position. In the second position, the crank action of State 3 and State 4 causes, at least in part (as there may be other factors which contribute to the opening of the valve including, for example, the upstream fluid pressure through the output valve, etc.), the spool VC3750 to be positioned to the far left as illustrated in FIG. 11. In State 4, there is no DC current flowing once the c113-vc110 circuit/path of SPDT switch S3 is opened. The VComm assembly stays at rest until a subsequent DC polarity reversal signal is received in State 1. The spool VC3750 in the second position enables external control fluid to enter fluid port VC3950, pass through the fluid management subsystem, and exit an open fluid port VC3970 while blocking fluid port VC3960 as illustrated in FIG. 13. The control fluid exiting the fluid port VC3970 enters an associated output valve(s) (e.g. via an external fluid passage such as a tube to a bonnet chamber) to cause, at least in part, the output valve(s) to close (an "off" state). In this example embodiment, the shaft second position is offset by approximately 180 degrees, plus or minus a few degrees (e.g., 1, 2, 3, 4, 5 degrees, etc.) from the first position in State 2.

Certain fluid systems, such as a BOOMBACK center pivot irrigation system or other fluid system including systems requiring a 4 port solenoid, may conventionally require separate control of multiple sets of output valves (e.g., wherein a set of output valves comprises a single output valve or a plurality of output valves) typically requiring a plurality of solenoids as described above. In contrast to such conventional systems, optionally, a VComm unit disclosed herein may be configured and utilized to efficiently and cost effectively control valves and irrigation areas. In an example embodiment of a Reverse Polarity II VComm unit (as described for example in FIGS. 24-27), the fluid management element may be configured with a 4 port spool/housing arrangement similar to that described above with respect to FIGS. 7 and 8. Linear movement of the spool to the far left (see FIG. 7) enables, for example, the spool grooves (and fluid element housing and O-rings) to create a first fluid passage whereby upstream control fluid traverses a first fluid passage and enters, for example via a fluid connection from output port 142300, a second set of output valves causing, at least in part, the second set of output valves to close (e.g., via fluid entering the bonnet diaphragm chamber causing the associated valves to close). Also, when the spool is to the far left, fluid is vented (e.g., to ambient) from the first set of output valves through a second fluid passage causing, at least in part, the first set of output valves to open (e.g., via fluid exiting the bonnet diaphragm chamber causing the valves to open). Linear movement of the spool to the far right (see FIG. 8) enables, for example, the spool grooves (and fluid element housing and O-rings) to create a third fluid passage enabling upstream control fluid to be directed into a first set of output valves causing, at least in part, the first set of output valves to close (e.g., via fluid entering the bonnet diaphragm chambers causing the valves to close). Also, when the spool is to the far right, fluid is vented (e.g., to ambient) from the second set of output valves through a fourth fluid passage through the fluid element causing, at least in part, the second set of output valves to open (e.g., via fluid exiting the bonnet diaphragm chamber causing the valve to open). Optionally, a fluid pressure booster described below may also be configured into the fluid element to assist in spool movement.

Thus, an example embodiment of a VComm assembly configured as described above, advantageously, can optionally be operationally controlled by a reversible polarity DC power supply.

Figure 1:
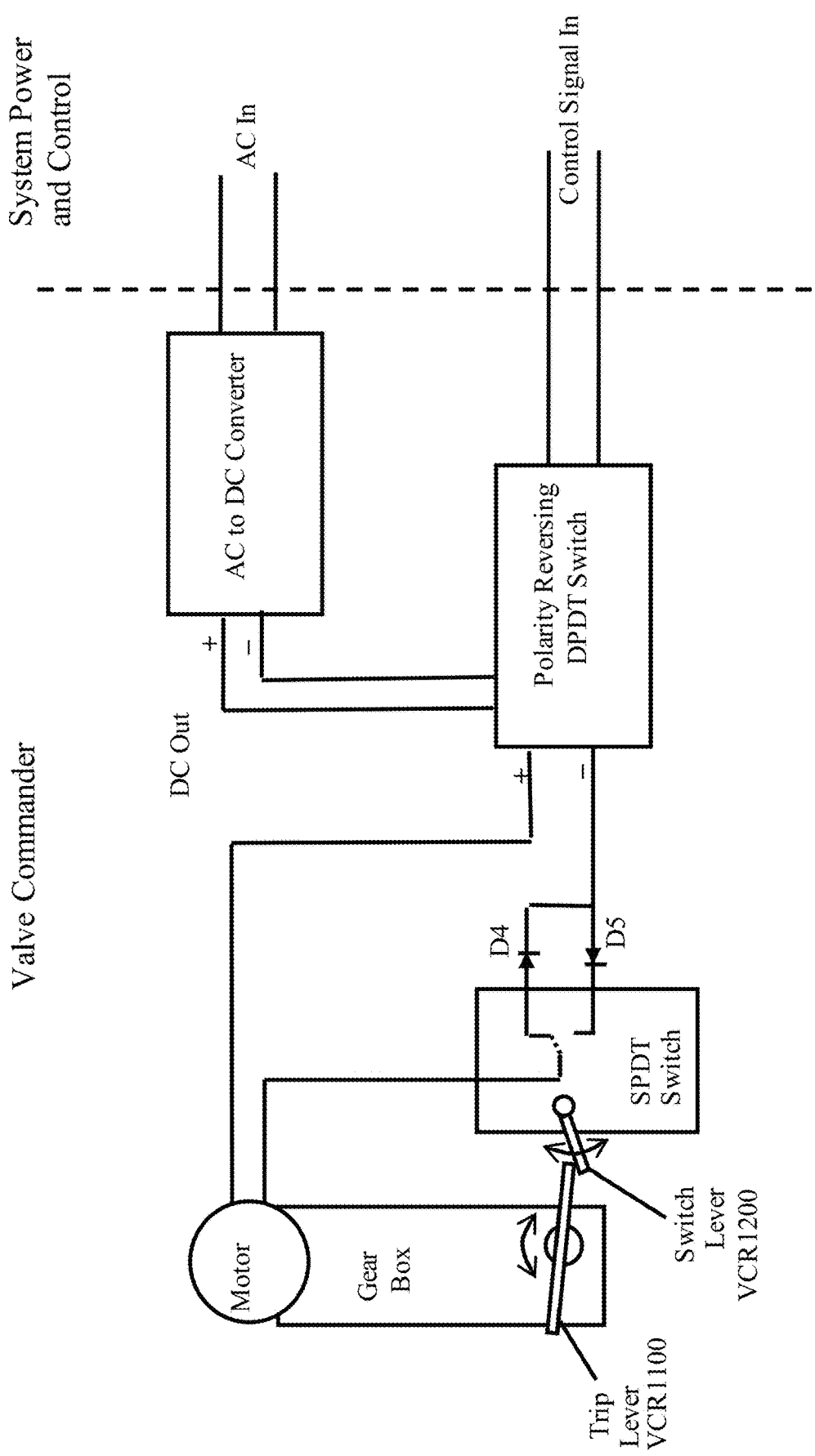
FIG. 1 illustrates a schematic of an example embodiment of a valve control using a reversible motor configuration with a trip lever in a first position.

In the example embodiment VComm assemblies previously described, the motor rotation occurs in the same direction through state transitions. This provides certain simplicities of design and assembly operation. A reversible motor VComm assembly can also be configured. In an example embodiment, a reversible motor VComm configuration utilizing circuits, switches, and mechanical trip levers is illustrated in the block diagram schematic in FIGS. 1 and 2, which are slightly different than those of the unidirectional drive configurations. The VComm assembly is illustrated to the left of the dotted line and the control signal and system power is provided to the right of the dotted line. FIGS. 1 and 2 illustrate a motor and gear box with a trip lever VCR1100 that replaces the cam VC3a100 in a unidirectional VComm unit. The lever VCR1100 rotates in a clock-wise or counter clock-wise direction as determined by the motor rotation which is determined by the polarity of the DC electrical source. When the trip lever VCR1100 encounters the SPDT switch lever VCR1200, it shuts off current flow for the polarity set by the operator control circuits. No current is drawn until the control signal reverses the polarity at which time the trip lever VCR1100 reverses direction and rotates 180° to engage the SPDT switch lever VCR1200 again shutting off current flow. Diodes D4 and D5 connected to the two terminals of the SPDT switch are set in opposite directions to allow current flow only when the polarity of the source is compatible with their arrangement. VCR1 and VCR2 show the SPDT switch in two different positions and the source polarity reversed. Current can flow in these configurations but after an approximate 180° rotation the trip lever VCR1100 changes the switch position to connect a path through the opposite polarity diode; no current can flow until the source polarity is reversed and the motor reversed. The plurality reversal control command may be issued in response to a user input.

Thus, the FIGS. 1 and 2 illustrate an AC powered system that uses an AC to DC converter with a polarity switching circuit, optionally controlled by a user. The use of a DPDT switch to change polarity may be controlled by AC or DC coils. Optionally, if a user has reversing polarity power available, the VComm assembly can be equipped without the AC to DC converter and DPDT switch. As similarly discussed above, if the operational voltage is too high for safe operation of the motor, a resistor R1 can be placed in the circuit to drop the voltage to an acceptable level. Optionally, the resistor R1 is a variable resistor which is user configurable via a variable resistor with an external control (such as a dial with one or more displayed resistance settings). Optionally, there may be multiple versions of a VComm unit, such as a version without a resistor and a version with a resistor or variable resistor.

Certain fluid systems, such as a BOOMBACK center pivot irrigation system or other fluid system including systems requiring a 4 port solenoid, may conventionally require separate control of multiple sets of output valves (e.g., wherein a set of output valves comprises a single output valve or a plurality of output valves) typically requiring a plurality of solenoids as described above. In contrast to such conventional systems, optionally, a VComm unit disclosed herein may be configured and utilized to efficiently and cost effectively control valves and irrigation areas. In an example embodiment of a Reverse Motor VComm unit (as described for example in FIGS. 1-2), the fluid management element may be configured with a 4 port spool/housing arrangement similar to that described above with respect to FIGS. 7 and 8. Linear movement of the spool to the far left (see FIG. 7) enables, for example, the spool grooves (and fluid element housing and O-rings) to create a first fluid passage whereby upstream control fluid traverses a first fluid passage and enters, for example via a fluid connection from output port 142300, a second set of output valves causing, at least in part, the second set of output valves to close (e.g., via fluid entering the bonnet diaphragm chamber causing the associated valves to close). Also, when the spool is to the far left, fluid is vented (e.g., to ambient) from the first set of output valves through a second fluid passage causing, at least in part, the first set of output valves to open (e.g., via fluid exiting the bonnet diaphragm chamber causing the valves to open). Linear movement of the spool to the far right (see FIG. 8) enables, for example, the spool grooves (and fluid element housing and O-rings) to create a third fluid passage enabling upstream control fluid to be directed into a first set of output valves causing, at least in part, the first set of output valves to close (e.g., via fluid entering the bonnet diaphragm chambers causing the valves to close). Also, when the spool is to the far right, fluid is vented (e.g., to ambient) from the second set of output valves through a fourth fluid passage through the fluid element causing, at least in part, the second set of output valves to open (e.g., via fluid exiting the bonnet diaphragm chamber causing the valve to open). Optionally, a fluid pressure booster described below may also be configured into the fluid element to assist in spool movement.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A fluid regulator, comprising:
   a shaft configured with at least:
      a cam, and
      a crank;
   an electric motor capable of rotating the shaft;
   an electric circuit comprising:
      a capacitor having a first capacitor terminal and a second capacitor terminal, the first capacitor terminal capable of being coupled to a power source and the second capacitor terminal coupled to the electric motor;
      a switching circuit comprising one or more switches including at least one relay, the switching-circuit having a least one switching circuit terminal coupled to the second capacitor terminal and at least one switching circuit terminal coupled to the electric motor;

a first housing, the first housing comprising:
   a first port that enables a bi-directional fluid path to an output valve, and
   a second port, wherein the second port is adapted to interface with a fluid source upstream from the output valve;

a spool contained within the first housing, the spool in operative communication with the shaft via the crank, wherein the spool is adapted to travel within the first housing;

an actuator configured to:
   open the output valve at least partly in response to:
      at least one switching circuit switch being opened in response to a current flow through the relay, which causes the electric motor to rotate the shaft towards a first shaft position and movement of the spool towards a first spool position which in turn causes,
      the cam to interface with the electric circuit, which in turn causes the shaft to stop at the first shaft position and the spool to stop at the first spool position, which enables a first fluid flow from the output valve to the first port;
   close the output valve at least partly in response to:
      at least one switching circuit switch being closed in response to a loss of the current flow through the relay, which causes the capacitor to discharge into the electric motor to rotate the shaft to towards a second shaft position and initiate movement of the spool towards a second spool position, which in turn causes,
      fluid pressure entering via the second port to assist movement of the spool towards a second spool position, which in turn causes,
      the cam to interface with the electric circuit, which in turn causes the shaft to stop at the second shaft position and the spool to stop at the second spool position, which enables a second fluid flow from the first port to the output valve.

2. The fluid regulator as defined in claim 1, wherein the output valve comprises an externally piloted diaphragm type valve.

3. The fluid regulator as defined in claim 1, wherein the first housing comprises a third port, the third port configured to output from the first housing the first fluid flow from the output valve.

4. The fluid regulator as defined in claim 1, wherein the crank is connected to the spool via a linkage, the linkage configured to translate rotational motion of the crank into a linear spool motion.

5. The fluid regulator as defined in claim 1, wherein the first fluid flow comprises fluid exiting a diaphragm chamber of the output valve.

6. The fluid regulator as defined in claim 1, wherein the second fluid flow comprises control fluid from a source external to the actuator.

7. The fluid regulator as defined in claim 1, wherein the switching circuit comprises a normally closed relay and a single pole double throw switch, wherein the normally closed relay is configured to receive a control signal from a remote device and to open in response to receipt of the control signal from the remote device, and the single pole double throw switch has a first terminal coupled to a power source, a second terminal coupled to the electric motor, and a third terminal coupled to the normally closed relay.

8. The fluid regulator as defined in claim 1, wherein the switching circuit comprises a normally closed relay and a single pole double throw switch, wherein the normally closed relay is configured to receive a control signal from a remote device, wherein the control signal energies a circuit, and to open in response to receipt of the control signal from the remote device, and the single pole double throw switch has a first terminal coupled to a power source, a second terminal coupled to the electric motor, and a third terminal coupled to the normally closed relay.

9. A fluid regulator, comprising:
   a shaft configured with at least:
      a cam, and
      a crank;
   an electric motor configured with an electric circuit, the electric motor capable of rotating the shaft;
   a first housing, the first housing comprising at least a first port configured to enable a bi-directional fluid path to an output valve;
   a spool contained within the first housing, the spool in operative communication with the shaft via the crank, wherein the spool is capable of travel within the first housing;
   an actuator configured to:
      open the output valve at least partly in response to:
         receipt of a control signal at a first state, wherein the control signal is provided from a remote device, which causes the motor to rotate the shaft towards a first shaft position and movement of the spool towards a first spool position which in turn causes,
         the cam to interface with the electric circuit, which in turn causes the shaft to stop at the first shaft position and the spool to stop at the first spool position, which enables a first fluid flow from the output valve to the first port;
      close the output valve at least partly in response to:
         receipt of the control signal at a second state, wherein the control signal is provided from the remote device, which causes the electric motor to rotate the shaft towards a second shaft position and movement of the spool towards a second spool position, which in turn causes,
         the cam to interface with the electric circuit, which in turn causes the shaft to stop at the second shaft position and the spool to stop at the second spool position, which enables a second fluid flow from the first port to the output valve;
      wherein the electric circuit comprises a capacitor, a normally closed relay, and a single pole double throw switch, wherein the normally closed relay is configured to receive the control signal from the remote device and the single pole double throw switch has a first terminal coupled to a power source, a second terminal coupled to the electric motor, and a third terminal coupled to the normally closed relay.

10. The fluid regulator as defined in claim 9, wherein the output valve comprises an externally piloted diaphragm type valve.

11. The fluid regulator as defined in claim 9, wherein the electric circuit includes a capacitor.

12. The fluid regulator as defined in claim 9, wherein the electric circuit includes a capacitor wherein the capacitor discharge energizes the electric motor to rotate the shaft towards the second shaft position.

13. The fluid regulator as defined in claim 9, wherein the first housing is further configured to include a second port, the second port capable of being in fluid communication with a fluid source upstream from the output valve.

14. The fluid regulator as defined in claim 9, wherein the first housing is further configured to include a second port, the second port capable of being in fluid communication with a fluid source upstream from the output valve wherein the fluid pressure from the upstream source facilitates movement of the spool towards the second spool position.

15. The fluid regulator as defined in claim 9, wherein the fluid comprises a gas.

16. The fluid regulator as defined in claim 9, wherein the first housing is further configured to include a second port, the second port configured to output from the first housing the first fluid flow from the output valve.

17. The fluid regulator as defined in claim 9, wherein the crank is connected to the spool via a linkage, the linkage configured to translate rotational motion of the crank into a linear spool motion.

18. The fluid regulator as defined in claim 9, wherein the second fluid flow comprises control fluid from a source external to the actuator.

19. The fluid regulator as defined in claim 9, wherein the spool is configured with O-rings to prevent fluid leakage between internal fluid communication channels formed by the spool and the first housing.

20. The fluid regulator as defined in claim 9, wherein the electric motor is configured with one or more gears to reduce electric motor overshoot.

21. A fluid regulator, comprising:
a shaft configured with at least:
 a cam, and
 a crank;
an electric motor configured with an electric circuit, the electric motor capable of rotating the shaft;
a first housing, the first housing comprising at least:
 a first port configured to enable a bi-directional fluid path to a first set of output valves, and
 a second port configured to enable a bi-directional fluid path to a second set of output valves;
a spool contained within the first housing, the spool in operative communication with the shaft via the crank, wherein the spool is capable of travel within the first housing;
an actuator configured to:
 open the first set of output valves and close the second set of output valves at least partly in response to:
  receipt of a control signal at a first state, wherein the control signal is provided from a remote device, which causes the motor to rotate the shaft towards a first shaft position and movement of the spool towards a first spool position which in turn causes,
  the cam to interface with the electric circuit, which in turn causes the shaft to stop at the first shaft position and the spool to stop at the first spool position, which enables:
   a first fluid flow from the second port to the second set of output valves, and
   a second fluid flow from the first set of output valves to the first port;
 close the first set of output valves and open the second set of output valves at least partly in response to:
  receipt of the control signal at a second state, wherein the control signal is provided from the remote device, which causes the electric motor to rotate the shaft towards a second shaft position and movement of the spool towards a second spool position, which in turn causes,
  the cam to interface with the electric circuit, which in turn causes the shaft to stop at the second shaft position and the spool to stop at the second spool position, which enables:
   a third fluid flow from the first port to the first set of output valves, and
   a fourth fluid flow from the second set of output valves to the second port.

* * * * *

UNITED STATES PATENT AND TRADEMARK OFFICE
CERTIFICATE OF CORRECTION

PATENT NO. : 10,571,937 B1  
APPLICATION NO. : 15/889549  
DATED : February 25, 2020  
INVENTOR(S) : James Walter Hurst It is certified that error appears in the above-identified patent and that said Letters Patent is hereby corrected as shown below:

On the Title Page

In Column 1, item (71), Applicant, Line 1, delete "Irrigation" and insert -- Irrigation, --.

In the Specification

In Column 2, Line 16, delete "to towards" and insert -- towards --.

In Column 4, Line 67, after "source" insert -- . --.

In Column 8, Line 32, delete "Vcomm" and insert -- VComm --.

In Column 8, Line 32, delete ""Vcomm"" and insert -- "VComm" --.

In Column 18, Line 46, delete "c113-vc110" and insert -- vc113-vc110 --.

In the Claims

In Column 22, Line 66, Claim 1, delete "switching-circuit" and insert -- switching circuit --.

In Column 22, Line 67, Claim 1, delete "a least" and insert -- at least --.

In Column 23, Line 32, Claim 1, delete "to towards" and insert -- towards --.

Signed and Sealed this  
Nineteenth Day of May, 2020

Andrei Iancu  
*Director of the United States Patent and Trademark Office*